(12) United States Patent
Gschwind et al.

(10) Patent No.: US 9,329,850 B2
(45) Date of Patent: May 3, 2016

(54) RELOCATION OF INSTRUCTIONS THAT USE RELATIVE ADDRESSING

(71) Applicant: INTERNATIONAL BUSINESS MACHINES CORPORATION, Armonk, NY (US)

(72) Inventors: Michael K. Gschwind, Chappaqua, NY (US); Valentina Salapura, Chappaqua, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 57 days.

(21) Appl. No.: 14/313,358

(22) Filed: Jun. 24, 2014

(65) Prior Publication Data

US 2015/0370558 A1   Dec. 24, 2015

(51) Int. Cl.
*G06F 9/45*   (2006.01)
*G06F 9/445*   (2006.01)
*G06F 9/30*   (2006.01)

(52) U.S. Cl.
CPC ... *G06F 8/52* (2013.01); *G06F 8/443* (2013.01); *G06F 9/44557* (2013.01); *G06F 9/3004* (2013.01)

(58) Field of Classification Search
None
See application file for complete search history.

(56) References Cited

U.S. PATENT DOCUMENTS

| | | | | |
|---|---|---|---|---|
| 6,006,033 | A * | 12/1999 | Heisch | G06F 8/445 711/125 |
| 6,202,205 | B1 * | 3/2001 | Saboff | G06F 8/443 717/151 |
| 6,618,779 | B1 * | 9/2003 | Branch | G06F 9/32 710/261 |
| 6,895,498 | B2 | 5/2005 | McDonald et al. | |
| 8,510,723 | B2 * | 8/2013 | Barua | G06F 8/52 717/136 |
| 8,990,547 | B2 * | 3/2015 | Callister | G06F 8/445 712/245 |
| 2005/0071833 | A1 * | 3/2005 | Rothman | G06F 9/4401 717/153 |
| 2007/0055961 | A1 * | 3/2007 | Callister | G06F 8/445 717/136 |

OTHER PUBLICATIONS

Prakash, A., An Instruction Scratchpad Memory Allocation for the Precision Timed Architecture, University of Waterloo [online], 2012 [retrieved Oct. 18, 2015], Retreived from Internet: <URL: https://uwspace.uwaterloo.ca/bitstream/handle/10012/7159/Prakash_Aayush.pdf?sequence=1>, pp. i-69.*

(Continued)

*Primary Examiner* — Todd Aguilera
(74) *Attorney, Agent, or Firm* — Steven L. Bennet, Esq.; Matthew M. Hulihan, Esq.; Heslin Rothenberg Farley & Mesiti PC

(57) ABSTRACT

Relocation of instructions that use relative addressing. Metadata relating to an instruction that uses relative addressing to access data and is to be relocated is stored prior to relocation. Based on relocating the instruction from one memory location to another memory location, a determination is made of an address to be used to access the data by the instruction. The determining is based on at least one of the metadata or an address of the another memory location. The instruction is executed at the another memory location, and the determined address is used to access the data.

17 Claims, 25 Drawing Sheets

(56) References Cited

OTHER PUBLICATIONS

Zheng, L., "Dynamic Program Instrumentation: Implementation Experience in HPUX", University of Wisconsin, Technical Report #1348 [online], 1997 [retrieved Oct. 18, 2015], Retrieved from Internet: <URL: http://research.cs.wisc.edu/techreports/1997/TR1348.pdf>, pp. 1-12.*

Power ISA™ Version 2.07, May 3, 2013, whole document.
"z/Architecture—Principles of Operation," IBM Publication No. SA22-7932-09, 10th Edition, Sep. 2012, whole document.
Gschwind, Michael K., et al., U.S. Appl. No. 14/231,648, entitled "Selectively Controlling Use of Extended Mode Features," filed Mar. 31, 2014, pp. 1-111.

* cited by examiner

RELOCATION OF INSTRUCTIONS THAT USE RELATIVE ADDRESSING

BACKGROUND

One or more aspects relate, in general, to relocation of instructions, and in particular, to the relocation of instructions that use relative addressing.

Some instruction set architectures include instructions that use relative addressing to access data. One type of relative addressing is program counter (PC)-relative addressing, in which an offset or displacement is provided from a current program counter address, and the resulting address is used to access the data. This enables position independent coding, in which such instructions are able to be loaded at different memory locations without affecting access to the data by those instructions, assuming the data remains in the same relative position from the instructions. That is, assuming the data remains at the offset from the program counter.

Examples of instructions that use PC-relative addressing include the load relative instruction and the store relative instruction, offered as part of the Z/ARCHITECTURE, provided by International Business Machines Corporation, Armonk, N.Y.

SUMMARY

Shortcomings of the prior art are overcome and advantages are provided through the provision of a computer program product for facilitating processing within a computing environment. The computer program product includes a computer readable storage medium readable by a processing circuit and storing instructions for execution by the processing circuit for performing a method. The method includes, for instance, storing, by a processor of the computing environment, metadata relating to an instruction of the computing environment to be relocated from one memory location to another memory location, the instruction using program counter (PC)-relative addressing to access data and the instruction included in code that is dynamically optimized resulting in relocating the instruction to provide a relocated instruction; based on relocating the instruction, determining an address to be used to access the data by the relocated instruction, the determining being based on at least one of the metadata or an address of the another memory location; and executing the relocated instruction at the another memory location, the executing using the address to access the data.

Methods and systems relating to one or more embodiments are also described and claimed herein. Further, services relating to one or more embodiments are also described and may be claimed herein.

Additional features and advantages are realized. Other embodiments and aspects are described in detail herein and are considered a part of the claimed invention.

BRIEF DESCRIPTION OF THE SEVERAL VIEWS OF THE DRAWINGS

One or more aspects are particularly pointed out and distinctly claimed as examples in the claims at the conclusion of the specification. The foregoing and other objects, features, and advantages are apparent from the following detailed description taken in conjunction with the accompanying drawings in which:

DETAILED DESCRIPTION

In accordance with one or more aspects, a capability is provided to relocate instructions that use relative addressing, such as PC-relative addressing, while preserving the validity of the instructions (i.e., while preserving data access by the instructions). This relocation is of the type in which the offset used to access the data may no longer be usable after relocation. Thus, a new offset is defined or other approaches are taken to provide accurate data access by the instructions being relocated.

In one particular example, the relocation is a result of dynamic optimization of code that includes the instructions. The optimized code includes the PC-relative instructions and those instructions may now be at different locations within the code, based on the optimization. Thus, the offset or displacement (offset and displacement are used interchangeably herein) from the program counter may no longer be valid. Therefore, in accordance with one aspect, an offset adjustment technique is provided to adjust the offset to provide valid instructions. Other and/or additional techniques may also be provided to enable instruction relocation while maintaining valid instructions.

Computing environments of different architectures may incorporate and use one or more aspects of the instruction relocation capability provided herein. For instance, environments based on the POWERPC architecture, also referred to as POWER ISA, offered by International Business Machines Corporation (IBM®) and described in POWER ISA™ Version 2.07, May 3, 2013", hereby incorporated by reference herein in its entirety, may include one or more aspects, as well as computing environments of other architectures, such as the Z/ARCHITECTURE, offered by International Business Machines Corporation, and described in Z/ARCHITECTURE—Principles of Operation, Publication No SA22-7932-09, 10th Edition, September 2012, which is hereby incorporated by reference herein in its entirety.

POWER, POWER ARCHITECTURE, POWERPC, Z/ARCHITECTURE, IBM, AIX, POWERVM, Z/OS and Z/VM (referenced herein) are registered trademarks of International Business Machines Corporation, Armonk, N.Y. Other names used herein may be registered trademarks, trademarks or product names of International Business Machines Corporation or other companies.

Figure 1:
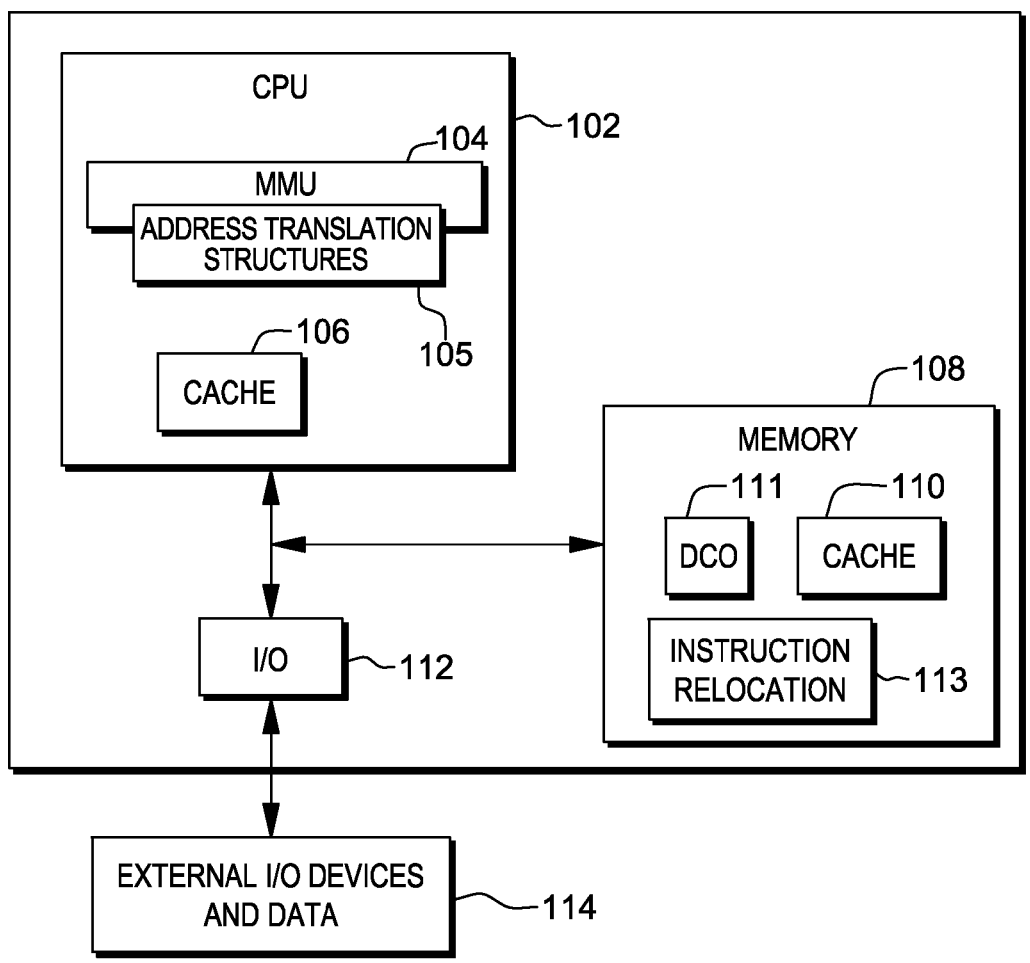
FIG. 1 depicts one example of a computing environment to incorporate and use one or more aspects of an instruction relocation capability.

One example of a computing environment to incorporate and use one or more aspects of the instruction relocation capability is described with reference to FIG. 1. In one example, a computing environment 100 includes a processor (central processing unit—CPU) 102 that includes at least one memory management unit (MMU) 104, one or more address translation structures 105, and one or more caches 106. Processor 102 is communicatively coupled to a memory portion 108 and to an input/output (I/O) subsystem 112. Memory portion 108 includes, for instance, one or more caches 110, an optional dynamic code optimizer (DCO) 111, which may be used to optimize applications executing within the processor, and instruction relocation logic 113, which may be used to facilitate relocation of instructions, such as instructions included in code optimized by DCO 111, or other instructions. As examples, instruction relocation logic may be included in DCO 111 in its entirety or in part, or be separate therefrom. I/O subsystem 112 is communicatively coupled to external I/O devices 114 that may include, for example, data input devices, sensors and/or output devices, such as displays.

Memory management unit 104 is used in managing memory portion 108 including facilitating access to the memory by providing address translation. To improve address translation, the memory management unit utilizes one or more address translation structures 105 including, for instance, a translation lookaside buffer (TLB) and a segment lookaside buffer (SLB) which, in one embodiment, are located in the MMU. The TLB is a cache of previously translated addresses. Thus, when a request is received for a memory access that includes an address to be translated, the TLB is checked first. If the address and its translation are in the TLB, then no further translation process based on using any number of translation techniques is necessary. Otherwise, the received address is translated using one of any number of translation techniques.

Figure 2:
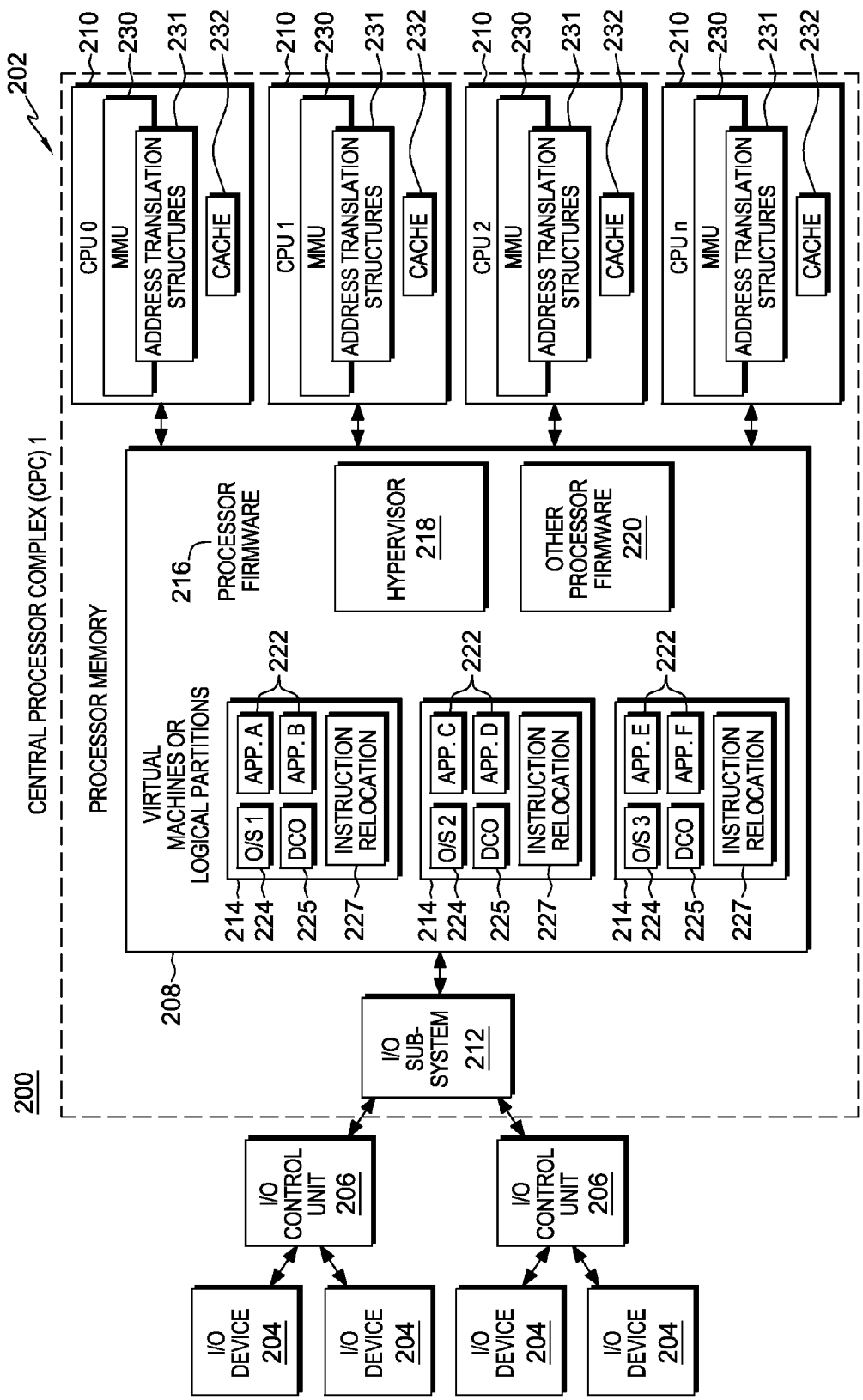
FIG. 2 depicts another example of a computing environment to incorporate and use one or more aspects of an instruction relocation capability.

A further embodiment of a computing environment to incorporate and use one or more aspects of an instruction relocation capability is depicted in FIG. 2. Referring to FIG. 2, in one example, a computing environment 200 includes a central processor complex (CPC) 202 coupled to one or more input/output (I/O) devices 204 via one or more control units 206. Central processor complex 202 includes processor memory 208 (a.k.a., main memory, main storage, central storage) coupled to one or more central processors (a.k.a., central processing units (CPUs)) 210 and an I/O subsystem 212, each of which is further described below.

Processor memory 208 includes one or more virtual machines 214 (for one example of the POWERPC architecture) or one or more logical partitions 214 (for one example of the Z/ARCHITECTURE), and processor firmware 216, which includes a hypervisor 218 and other processor firmware 220. As used herein, firmware includes, e.g., the microcode and/or millicode of the processor. It includes, for instance, the hardware-level instructions and/or data structures used in implementation of higher level machine code. In one embodiment, it includes, for instance, proprietary code that is typically delivered as microcode that includes trusted software or microcode specific to the underlying hardware and controls operating system access to the system hardware.

Each virtual machine or logical partition 214 functions as a separate system and has one or more applications 222, and optionally, a resident operating system 224 therein, which may differ for each virtual machine or logical partition. In one embodiment, the operating system is the Z/VM operating system, the Z/OS operating system, the Z/LINUX operating system, the TPF operating system, the AIX operating system, the POWERLINUX operating system, the IBM I/OS operating system, or another operating system, offered by International Business Machines Corporation, Armonk, N.Y., or another operating system offered by another company. Further, each logical partition or virtual machine may include a dynamic code optimizer 225 or other optimizer that may execute as part of the operating system, part of one or more applications or on its own to provide optimized application code; and/or instruction relocation logic 227 to be used to facilitate relocation of instructions. Again, the instruction relocation logic may be part of the optimizer, in whole or in part, or separate therefrom.

The virtual machines are managed by hypervisor 218, such as POWERVM, offered by International Business Machines Corporation, Armonk, N.Y.; and the logical partitions are managed by hypervisor 218, such as the PROCESSOR RESOURCE/SYSTEM MANAGER (PR/SM), offered by International Business Machines Corporation, Armonk, N.Y.

Central processors 210 are physical processor resources assignable to the virtual machines or allocated to the logical partitions. For instance, each virtual machine or logical partition 214 includes one or more logical processors, each of which represents all or a share of a physical processor 210 that may be dynamically allocated to the virtual machine or partition. A central processor may include a memory management unit (MMU) 230 and one or more address translation structures 231 providing address translation, as described herein, and at least one cache 232.

Input/output subsystem 212 directs the flow of information between input/output devices 204 and main memory 208. It is coupled to the central processing complex, in that it can be a part of the central processing complex or separate therefrom. The I/O subsystem relieves the central processors of the task of communicating directly with the input/output devices and permits data processing to proceed concurrently with input/output processing. To provide communications, the I/O subsystem employs I/O communications adapters. There are various types of communications adapters including, for instance, channels, I/O adapters, PCI cards, Ethernet cards, Small Computer Storage Interface (SCSI) cards, etc. Further, the I/O subsystem uses one or more input/output paths as communication links in managing the flow of information to or from input/output devices 204.

Figure 3A:
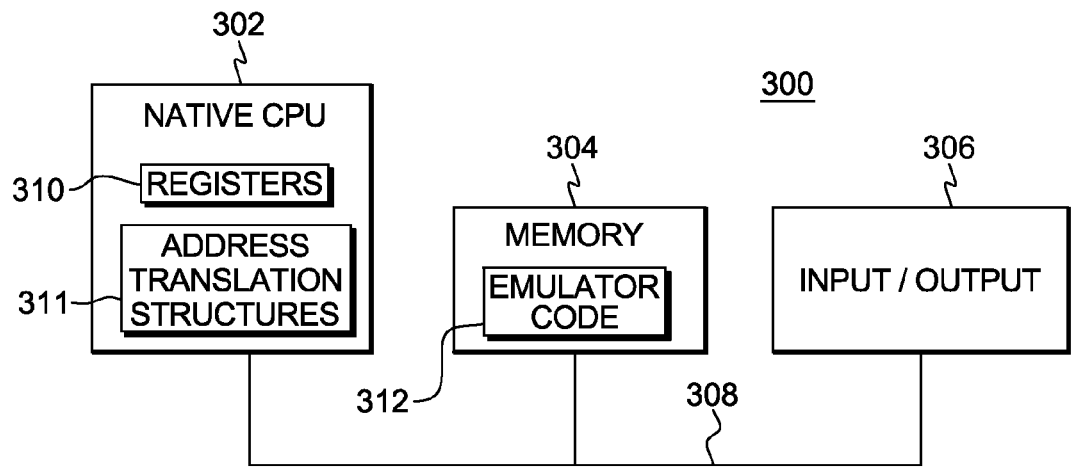
FIG. 3A depicts yet another example of a computing environment to incorporate and use one or more aspects of an instruction relocation capability.

Another embodiment of a computing environment to incorporate and use one or more aspects of the instruction relocation capability is described with reference to FIG. 3A. In this example, a computing environment 300 includes, for instance, a native central processing unit (CPU) 302, a memory 304, and one or more input/output devices and/or interfaces 306 coupled to one another via, for example, one or more buses 308 and/or other connections. As examples, computing environment 300 may include a POWERPC processor, or a POWER SYSTEMS server offered by International Business Machines Corporation, Armonk, N.Y.; an HP SUPERDOME with Intel ITANIUM II processors offered by Hewlett Packard Co., Palo Alto, Calif.; and/or other machines based on architectures offered by International Business Machines Corporation, Hewlett Packard, Intel, Oracle, or others.

Native central processing unit 302 includes one or more native registers 310, such as one or more general purpose registers and/or one or more special purpose registers used during processing within the environment, as well as one or more address translation structures 311. These registers include information that represents the state of the environment at any particular point in time.

Moreover, native central processing unit 302 executes instructions and code that are stored in memory 304. In one particular example, the central processing unit executes emulator code 312 stored in memory 304. This code enables the computing environment configured in one architecture to emulate another architecture. For instance, emulator code 312 allows machines based on architectures other than the Z/ARCHITECTURE, such as POWERPC processors, POWER SYSTEMS servers, HP SUPERDOME servers or others, to emulate the Z/ARCHITECTURE and to execute software and instructions developed based on the Z/ARCHITECTURE, or allows machines based on architectures other than the POWER Architecture, such as HP SUPERDOME servers or others, to emulate the POWER Architecture and to execute software and instructions developed based on the POWER Architecture.

Figure 3B:
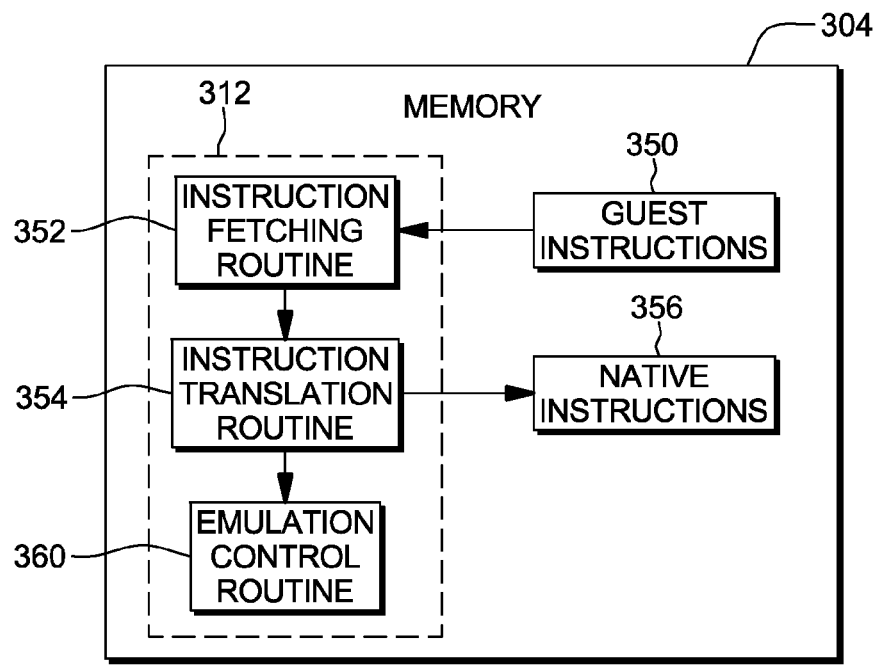
FIG. 3B depicts further details of the memory of FIG. 3A.

Further details relating to emulator code 312 are described with reference to FIG. 3B. Guest instructions 350 stored in memory 304 comprise software instructions (e.g., correlating to machine instructions) that were developed to be executed in an architecture other than that of native CPU 302. For example, guest instructions 350 may have been designed to execute on POWER Architecture or Z/ARCHITECTURE processor 102, but instead, are being emulated on native CPU 302, which may be, for example, an Intel ITANIUM II processor. In one example, emulator code 312 includes an instruction fetching routine 352 to obtain one or more guest instructions 350 from memory 304, and to optionally provide local buffering for the instructions obtained. It also includes an instruction translation routine 354 to determine the type of guest instruction that has been obtained and to translate the guest instruction into one or more corresponding native instructions 356. This translation includes, for instance, identifying the function to be performed by the guest instruction and choosing the native instruction(s) to perform that function.

Further, emulator code 312 includes an emulation control routine 360 to cause the native instructions to be executed. Emulation control routine 360 may cause native CPU 302 to execute a routine of native instructions that emulate one or more previously obtained guest instructions and, at the conclusion of such execution, return control to the instruction fetch routine to emulate the obtaining of the next guest instruction or a group of guest instructions. Execution of the native instructions 356 may include loading data into a register from memory 304; storing data back to memory from a register; or performing some type of arithmetic or logic operation, as determined by the translation routine.

Each routine is, for instance, implemented in software, which is stored in memory and executed by native central processing unit 302. In other examples, one or more of the routines or operations are implemented in firmware, hardware, software or some combination thereof. The registers of the emulated processor may be emulated using registers 310 of the native CPU or by using locations in memory 304. In embodiments, guest instructions 350, native instructions 356 and emulator code 312 may reside in the same memory or may be disbursed among different memory devices.

The computing environments described above are only examples of computing environments that can be used. Other environments, including but not limited to, other non-partitioned environments, other partitioned environments, and/or other emulated environments, may be used; embodiments are not limited to any one environment.

Computing environments, such as those described above, execute code that may have instructions that use relative addressing, such as PC-relative addressing, to access data. For instance, instructions use PC-relative addresses to access data by providing an offset or displacement from the current PC address to obtain a resulting address, which is used to access the data.

Figure 4:
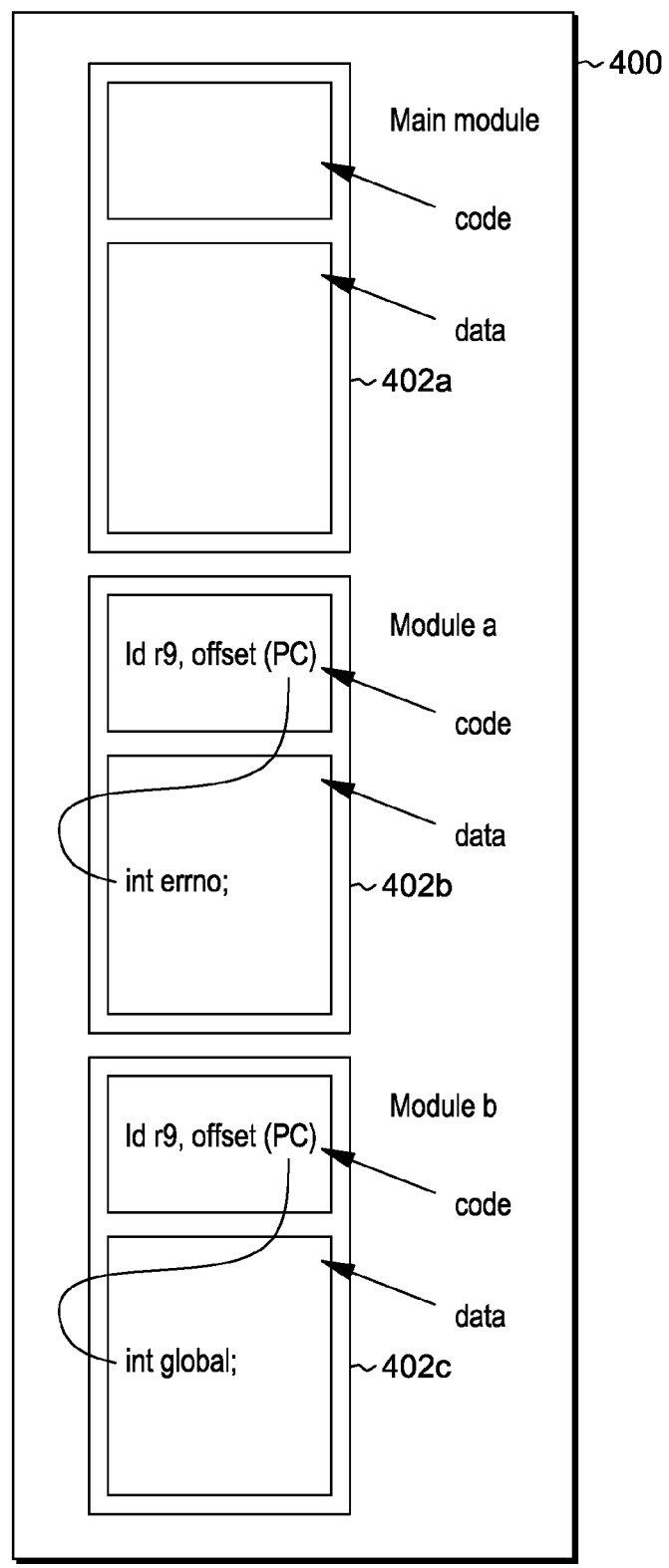
FIG. 4 depicts one example of a program having instructions that use relative addressing.

As depicted in FIG. 4, an application 400 may include a plurality of modules 402a-402c, such as a main module 402a; a Module a 402b that may provide, e.g., file I/O; and a Module b 402c that may provide a standard math function, as examples. Each module includes code and data, and the modules, except the main module, can be loaded in any order and at any location. Thus, the addresses of the data are not to be coded directly. Instead, position independent coding is used, so regardless of where the module is loaded, the data may be accessed. This is possible using relative addressing, such as PC-relative addressing, in which the data is reached using the current PC address of the instruction plus an offset. For instance, ld r9, offset (PC) represents load register 9 with the data at PC plus the offset. In accordance with one embodiment, an instruction that codes the PC directly is used. In another embodiment, a PC-relative access is coded, e.g., using an add PC with shifted immediate value, addpcis instruction, computing a target address including the PC and a (possibly shifted) immediate value that is subsequently used to specify a base address for memory accesses.

In one embodiment of an addpcis instruction, if RA (designated in the instruction) is equal to 0, then RT (designated in the instruction) is equal to $(NIA)+EXTS(SI\|^{16}0)$, where SI is designated in the instruction; NIA is equal to a next instruction address; and EXTS is extend sign, which is a function to take an immediate value and sign extend it to the appropriate length, as needed.

Since the PC-relative addressing adds an offset to an address, if that address changes relative to the data because, e.g., the instruction is moved (but the data remains or moves but not proportionately), the offset may no longer be accurate. That is, it no longer accurately addresses the data. Thus, in accordance with an aspect, a capability is provided that enables PC-relative instructions to be moved while preserving the validity of the instructions.

Figure 5:
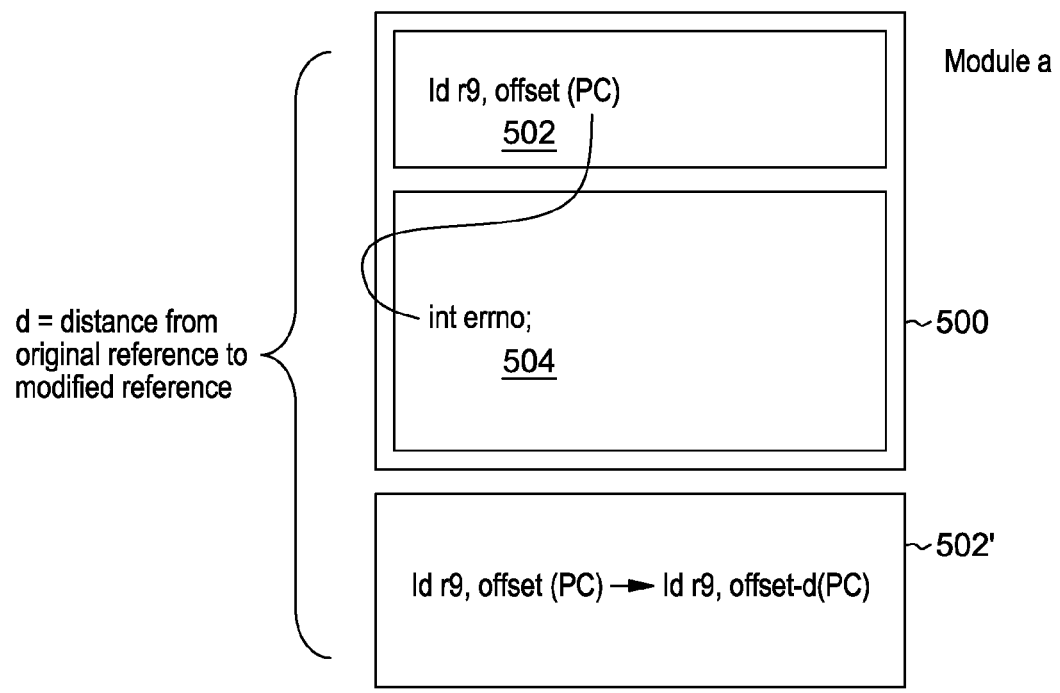
FIG. 5 depicts one example of adjusting an offset used in relative addressing.

In one embodiment, this is accomplished by adjusting the offset. For instance, as shown in FIG. 5, a module 500 includes code 502 and data 504. The code is moved for one or more reasons to a new location, shown as code 502', while the data is not moved. The code is now a distance, d, from the original reference to the new reference. Thus, in this example, a new offset is determined as offset−d. Therefore, offset−d (PC) is used to access data 504. For instance, within code 502', ld r9, offset (PC) becomes ld r9, offset−d (PC). Other examples are possible. For instance, if code 502' is moved before code 500, then the offset is modified as offset+d. Many other variations are possible.

As a further example of adjusting the offset, a PC-relative reference is translated into an absolute reference a, in which (a=PC+offset). For example, ld r9, offset (PC) is translated into an internal representation (IR) representing ld r9, a. Optimization is then performed using absolute reference, a. During generation of, for instance, the optimized code, or otherwise relocation of code, references to absolute address a are replaced with access to a PC-relative address and a new offset, newoffset=a−IA, where a is the absolute address from above, and IA is the instruction address being generated, e.g., ld r9, newoffset (PC).

In further embodiments, instead of, or in addition to adjusting the offset, other techniques may be used to move PC-relative instructions, while preserving the validity of the instructions. For instance, in one embodiment, code using the absolute address directly may be generated for the relocated code in lieu of a PC-relative access code. As a further example, long address forms may be used, in which a new instruction is provided that allows a larger offset (e.g., 64 bits rather than 32 bits) enabling the code to be farther away from the data, when such forms are provided by an instruction set. Such long forms can be used either when provided as a single instruction, or in conjunction with a multi-instruction sequence where multiple ISA instructions may be combined, e.g., addpcis r9, PC, (offset−d)@ha; ld r9, r9, (offset−d)@l, where @ha represents the high order bits and @l represents the lower order bits. In further examples, an address is loaded from an address pool; or a load is performed from a base register pointing into the original code, each of which is described below.

For example, in one embodiment, an address is loaded from an address pool. In such an embodiment, two loads are performed: e.g., ld r9, offset (PC) becomes ld r9, pool (PC); ldx r9, PC, r9, in which a long offset (e.g., offset−d) is stored in a constant pool, and then that offset loaded into r9 is used to access the data. In another sequence, ld r9, offset (PC) becomes ld r9, pool (PC); ld r9, 0(r9), in which the full address (including the PC value combined with the original offset and the relocation distance d) is stored in a constant pool, and then the address loaded from the constant pool is loaded into r9 and used to access the data.

In yet a further embodiment, a base register is used to point into the original code, and then an offset may be used. For example, a register is initialized with an address specifying the original code, and this address may be obtained from a special purpose register, such as a Come-From Address Register (CFAR) or a target address register (TAR), as examples. For instance, if CFAR is used, a move from special purpose register (mfspr) instruction is used to initialize a general purpose register, r9, with the value in CFAR, which points to the original code. Then, an offset, such as the original offset, may be used to reference the data.

As one example, the Come-From-Address Register (CFAR) is a 64-bit register. When, e.g., a Return From Interrupt Doubleword (rfid) instruction is executed, the register is set to the effective address of the instruction. When a branch instruction is executed and the branch is taken, the register is set to the effective address of an instruction in the instruction cache block containing the branch instruction, except that if the branch instruction is a B-form branch (i.e., bc, bca, bcl or bcla) for which the target address is in the instruction cache block containing the branch instruction or is in the previous or next cache block, the register is not necessarily set.

The contents of the CFAR can be read and written using the mfspr (move from special purpose register) and the mtspr (move to special purpose register) instructions. In executing mfspr, contents of a special purpose register (spr) designated in mfspr are placed into a register, RT, designated in mfspr. Similarly, in executing mtspr, contents of a register, RS, designated in mtspr are placed in the spr also designated in mtspr. Access to the CFAR is privileged, in one embodiment.

In accordance with another aspect, access to CFAR is not privileged, or is at least made available to code that requires instruction relocation for PC-relative accesses, e.g., for code that is being optimized by DCO. In at least one embodiment, the capability is made available using mechanisms to give access to extended modes for DCO. For instance, an optimizer identifies application code to be modified and modifies that code, such that the application includes unmodified code and modified code. Based on generating the modified code, the optimizer sets one or more controls to selectively enable use of extended mode features by the application. The extended mode features include one or more features at an instruction set level different from an instruction set level available to the application. The controls may be set in a control register or entries of address translation structures, as examples. Extended modes are further described in U.S. Ser. No. 14/231,648, entitled "SELECTIVELY CONTROLLING USE OF EXTENDED MODE FEATURES," Gschwind, et al., filed Mar. 31, 2014, which is hereby incorporated by reference herein in its entirety. In at least one embodiment, it is further used in conjunction with techniques to enable partition mobility to systems where access to CFAR is not available.

In accordance with at least one embodiment, only some branches initialize the CFAR register. In accordance with one such embodiment, transfers to optimized code are generated using such branch instructions initializing CFAR. In one such embodiment, optimized code is generated using instructions not setting the CFAR, so as to preserve a base value of the CFAR. In at least one embodiment, such branches are provided as an extended mode by an architecture. In another embodiment, no CFAR-preserving branch instructions are provided, and a DCO or other code component is to generate code to copy the value of the CFAR register to another register prior to use in optimized code after a CFAR value has been overwritten responsive to a branch in the optimized code.

In accordance with one embodiment, the value provided in CFAR is made available as soon as CFAR is accessed and without requiring a context synchronizing instruction, such as Isync. An instruction or event is context synchronizing if, e.g., the operation causes instruction dispatching (the issuance of instructions by the instruction fetching mechanism to any instruction execution mechanism) to be halted; the operation is not initiated or, in the case of Isync, does not complete until all instructions that precede the operation have completed to a point at which they have reported all exceptions they will cause; the operation ensures that the instructions that precede the operation will complete execution in the context (privilege, relocation, storage protection etc.) in which they were initiated, except that the operation has no effect on the context in which the associated reference and change bit updates are performed; if the operation directly causes an interrupt or is an interrupt, the operation is not initiated until no exception exists having higher priority than the exception associated with the interrupt; and the operation ensures that the instructions that follow the operation will be fetched and executed in the context established by the operation.

In accordance with another embodiment, DCO code (or other such code) is to execute a context synchronizing instruction before using the value in CFAR. In accordance with one aspect, the DCO compiler (or other component) inserts a context synchronizing instruction, e.g., one of the instructions in accordance with the POWER ISA v2.07, or in accordance with another architecture, into the instruction stream prior to using CFAR. In accordance with another embodiment, a test is made as to whether a context synchronizing instruction is present between a branch instruction initializing a CFAR value and a first use of such value. If a context synchronizing instruction is present, no further action is taken. If a context synchronizing instruction is not present, the DCO compiler (or other component) inserts a context synchronizing instruction, e.g., one of the instructions in accordance with the POWER ISA v2.07, or in accordance with another architecture, into the instruction stream prior to using CFAR.

In a further embodiment, instead of using a program counter, a load (ld) or store (st) instruction may be provided that uses a special purpose register, such as CFAR: e.g., ld/st RX, disp(CFAR). In this example, an offset or displacement is added to the value in CFAR and the resulting value is loaded in RX. This new instruction is used instead of using mfspr to load a general purpose register and using a copy of the CFAR in a general purpose register in conjunction with load instructions directed at using general purpose registers as base registers. In yet another embodiment, an add CFAR with (shifted) immediate instruction addcfaris is provided. In accordance with at least one embodiment of such an instruction, the instruction adds a (possibly shifted) value into a target register RT. In at least one embodiment, fusion is provided so as to combine addcfaris rt, cfar, offset@ha; ld rt, rt, offset@l into a single internal instruction (or iop) ld rt, offset (CFAR).

In accordance with an embodiment using the CFAR register as a base, a new displacement can be computed to translate ld r9, offset(pc), the new displacement corresponding to (offset+d) wherein d=(value of PC at original LD instruction)−(value of CFAR corresponding to the address of the branch instruction that causes CFAR to be initialized).

In yet further embodiments, memory layout-based solutions are provided, which strategically place the moved code closer to the data. For instance, when the original code is being optimized and is to relocate one or more PC-relative accesses, the optimized code, which is stored in a different memory location, is placed closer to the original code, and therefore, the data. These memory layout-based solutions, as well as optimization, are described in further detail below.

Computing environments, such as those described above, are enhanced by including components that alter application programs executing within the environments to provide those application programs with additional features. For instance, a component, referred to as dynamic code optimization (DCO), may be provided that examines programs as they are executing, recognizes frequently executed code segments and optimizes those segments. Other types of optimization are also possible, as well as other types of components. Further, changes may be made to programs for other reasons, such as correcting an error, providing workarounds for known hardware errata, enhancing security, etc.

Changing a program while it is executing is complicated and issues may arise. For instance, if a program references itself, i.e., it is self-referential, it may detect the change and refuse to run or the change may cause it to run improperly due to it being self-referential. An example of a self-referential code may be a binary that validates its own correctness by computing the checksum of its program code, and comparing the computed result with an expected result to avoid tampering. Thus, in accordance with one aspect, a capability is provided that allows applications to be modified, while preserving self-referential integrity.

In one example, for dynamic code optimization, code that is not frequently used is maintained unchanged, and code that is frequently used, referred to as hot spots, are dynamically compiled into optimized code and the pre-existing code is patched to integrate the optimized code into the pre-existing code generating patched code. Then, to transfer to the optimized code, the original binary is modified (patched) by inserting a jump instruction to jump to the optimized code and when done, another jump instruction is inserted to jump back to the original code.

In one particular example, in optimizing code that includes one or more PC-relative instructions, one or more portions of the application code are modified (e.g., changed, revised, enhanced, updated, optimized, etc.), and therefore, the application code is considered patched (i.e., existing code is used along with the modifications). A portion of the code to be modified is copied, modified, and stored in one or more memory regions (e.g., pages of memory) that are separate from the memory regions storing the pre-existing or unmodified application code. When code is patched, in accordance with one or more aspects, separate address translation is provided, which depends, for instance, on whether the translation is for an instruction fetch or a data access. For instance, data accesses (e.g., address translation for data accesses) are directed to the unmodified code (i.e., one or more first memory regions), while code translation (e.g., address translation for instruction fetches) is directed to the modified code (i.e., one or more second memory regions). Additionally, instruction fetches and data accesses for code of the application that has not been copied are directed to the same pre-existing code, which are also stored in the one or more first memory regions, in this example. This separate address translation is accomplished by, for instance, hardware support that selectively manages separate instruction and data translation within a processor, enabling only portions (e.g., modified portions) of the code to be duplicated rather than the entire code.

Figure 6:
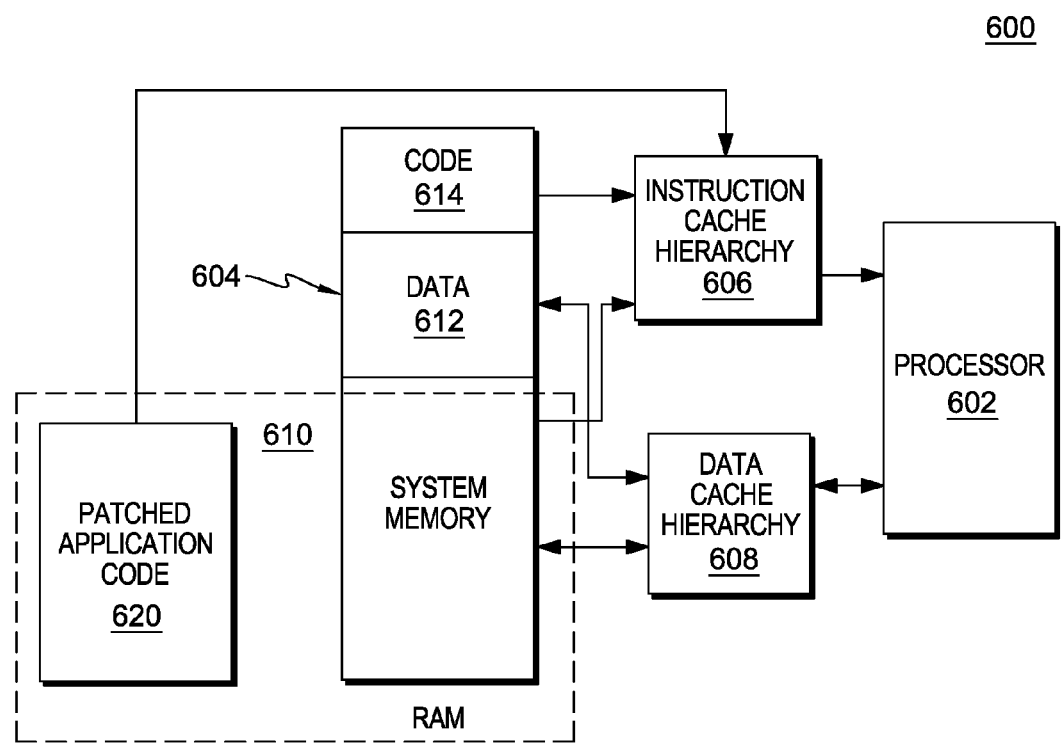
FIG. 6 depicts one example of a computing environment including patched application code.

One example of a computing environment that includes patched code is depicted in FIG. 6. This computing environment is based, for instance, on the POWERPC architecture offered by International Business Machines Corporation, however many other systems may incorporate and use one or more of the aspects described herein. As shown, a computing environment 600 includes, for instance, a processor 602 coupled to a memory 604 via one or more caches 606, 608. Memory 604 is, for instance, random access memory, having a plurality of portions, including, for example, system memory 610, data memory 612, and code memory 614 (also referred to as instruction memory). In one example, system memory 610 includes application code, including, for instance, patched application code 620, and/or data for one or more applications; data memory 612 is memory used by, for instance, an optimizer; and code memory 614 is, for instance, code of the optimizer. Code memory 614 is coupled to instruction cache 606 accessed by processor 602; and data memory 612 and system memory 610 are coupled to data cache 608 accessed by processor 602. Further, system memory 610, including patched application code 620, is also coupled to instruction cache 606.

In particular, in one embodiment, system memory 610 includes, for instance, application code for one or more applications, including patched application code 620. For example, application code for a particular application is stored in one or more memory regions (e.g., pages) of system memory 610. If the particular application is modified, then it is referred to as patched application code, which includes the existing code plus the modified code. From a memory viewpoint, the portions of the patched application code that have not been modified continue to be stored in the same memory regions as the pre-existing application code, and any duplicated or modified code is stored in one or more memory regions of system memory 610 separate from the memory regions of the pre-existing or unmodified application code. This, in conjunction with support for address translation of memory addresses as a function of access attributes, e.g., using separate instruction/data translation (described below), allows the view of memory from the instruction fetcher to be fenced off, enabling the use of patched code while maintaining referential integrity.

Figure 7:
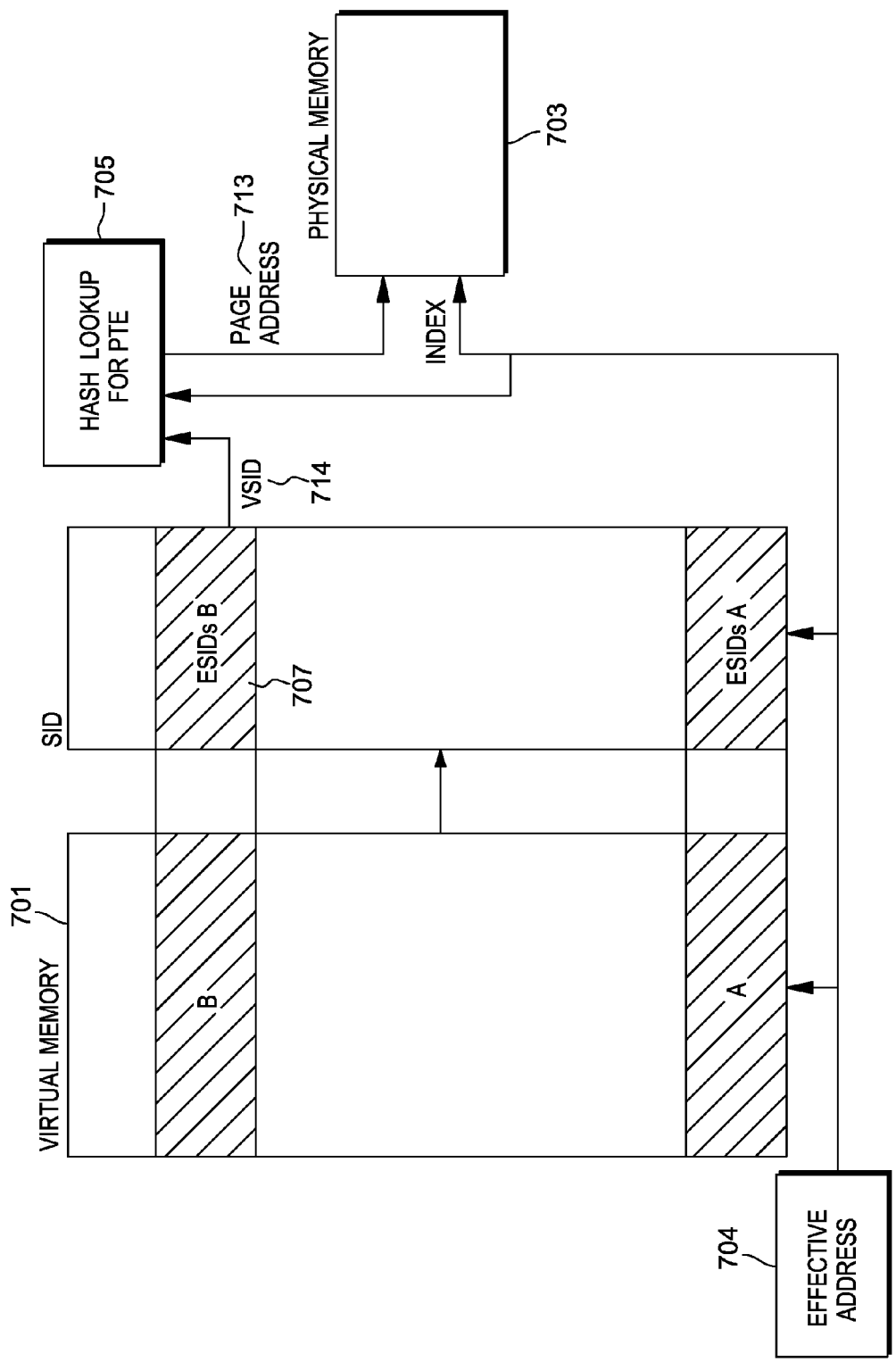
FIG. 7 illustrates an example of a high-level view of a virtual memory mapped to a physical memory using a hash page table technique.

Details regarding physical memory used by one or more of the computing environments described herein and access thereto are described with reference to FIG. 7. As is known, physical memory is of a defined size and in order to have the physical memory appear larger than it is, virtual memory is utilized. One example of a high-level view of virtual memory 701 mapped to a physical memory 703 (such as memory 108, 208, 304, 604 or a portion thereof) is depicted in FIG. 7. In this example, the mapping from virtual memory to real memory is via a hash page table (HPT) technique 705 to locate page table entries (PTEs), as used by, for example, POWER ISA. In this example, programs only use sections (or segments) A and B of the virtual memory. Each segment of the virtual memory is mapped to a segment identifier (SID) entry 707 identified by an effective segment ID (ESID) (ESIDs for B and ESIDs for A included). An "effective address" 704 used by the program selects an SID entry, which includes the ESID value, as well as a virtual segment ID (VSID) 714 value. The VSID value represents the high-order bits of a virtual address to be used by hashing algorithm 705 to search the hash page table. A hashed value based on the VSID is used to locate a page table entry (PTE). The page table entry includes an address 713 of a page of physical memory 703.

Figure 8:
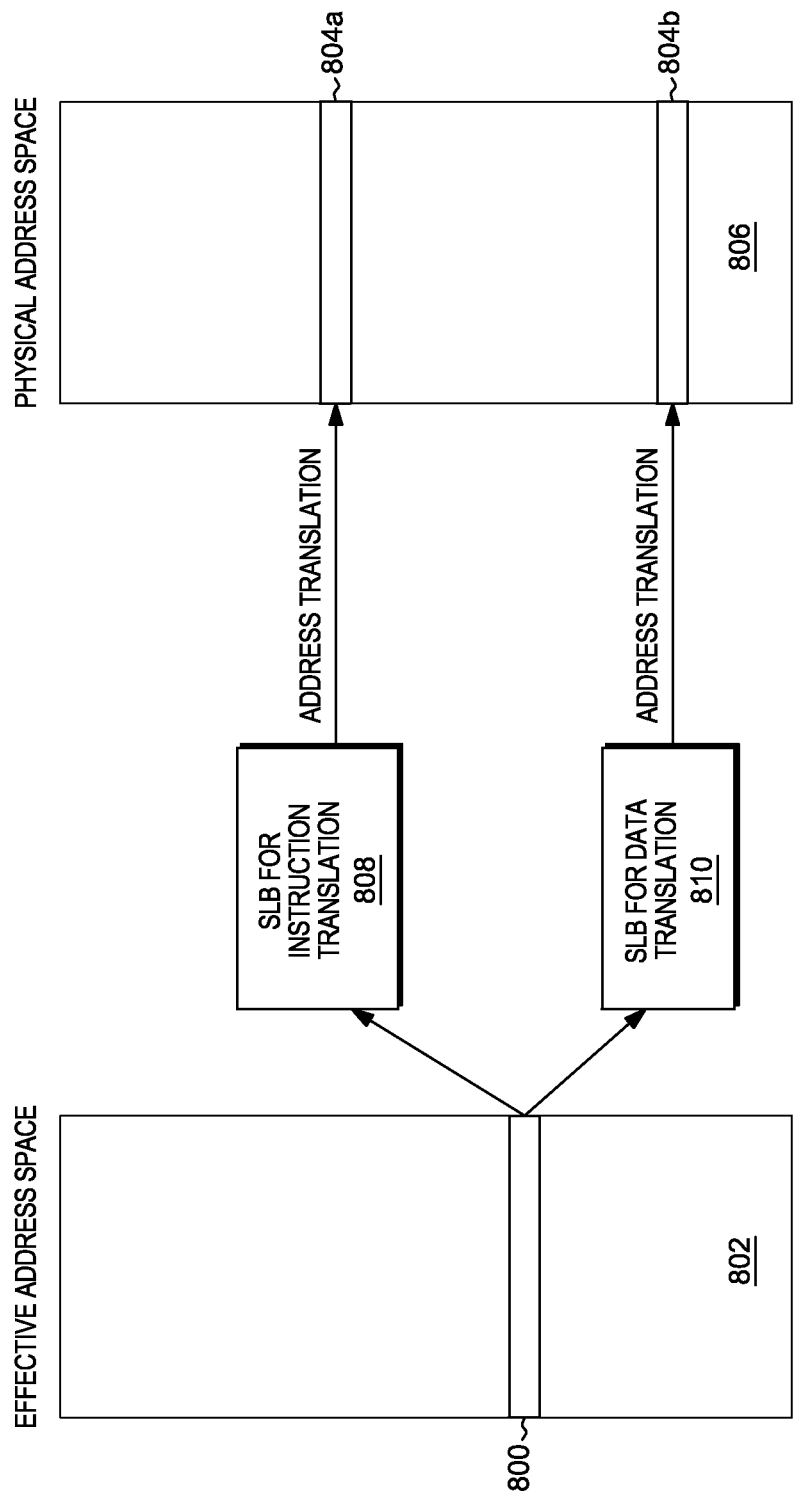
FIG. 8 depicts one example in which one effective address is able to be translated to different physical addresses.

As indicated above, an effective address is used to obtain a physical address in order to access a particular memory location. In accordance with one aspect, as depicted in FIG. 8, one effective address 800 in an effective address space 802 may translate to multiple physical addresses 804*a*, 804*b* of a physical address space 806 depending on whether the translation is for an instruction translation 808 or a data translation 810. In particular, in one embodiment, separate address translation (i.e., separate instruction and data translation) may be used in certain situations, such as for instance, when code has been modified, but the modified code is to be hidden from data accesses. In such a situation, the modified code is placed in a separate memory region at a different physical address than the unmodified code, and the physical address of the separate memory region is determined via address translation for instruction fetches. The unmodified code, however, is still accessed by data accesses, which use address translations for data accesses that point to another physical address (i.e., of the unmodified code). This allows, for instance, the view of memory the instruction fetcher sees to be fenced off from the view of the data accesses. For those situations, where the code is unchanged, address translation for instruction fetches and data accesses point to the same physical memory locations. These locations are referred to as being shared for instruction fetches and data accesses.

In accordance with one aspect, an address translation capability is described in which the address translation takes into consideration whether the memory access is for an instruction fetch or a data access. One embodiment of address translation is described with reference to FIGS. 9-12. The particular example described herein is for the POWERPC architecture; however, aspects of the address translation capability are not limited to such an architecture.

Figure 9:
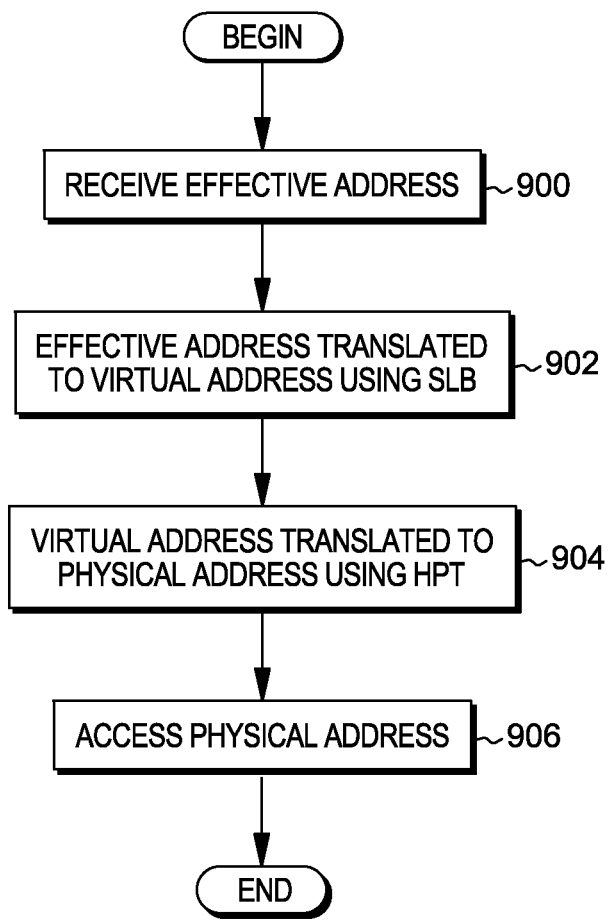
FIG. 9 depicts one embodiment of an address translation process.

Initially, referring to FIG. 9, a memory management unit (MMU) of a processor receives an effective address to be translated, STEP 900. The effective address is, for instance, a 64-bit address that may be received in an address translation request from the processor. As examples, the request may be from an instruction fetch unit of the processor, and therefore, the address to be translated is assumed to be for an instruction fetch, or the request may be from a load/store unit of the processor, and therefore, the address to be translated is assumed to be for a data access. In other embodiments, an indication in the request indicates whether the address translation is for an instruction fetch or a data access. The MMU translates the effective address to a virtual address, STEP 902. In one example, the translation from the effective address to the virtual address uses a segment lookaside buffer (SLB), as described further below. The MMU then translates the virtual address to a physical address, STEP 904. In one particular example, the translation from the virtual address to the physical address uses a hash page table, again as described further below. The MMU then uses the physical address to access the particular memory location, STEP 906.

Figure 10:
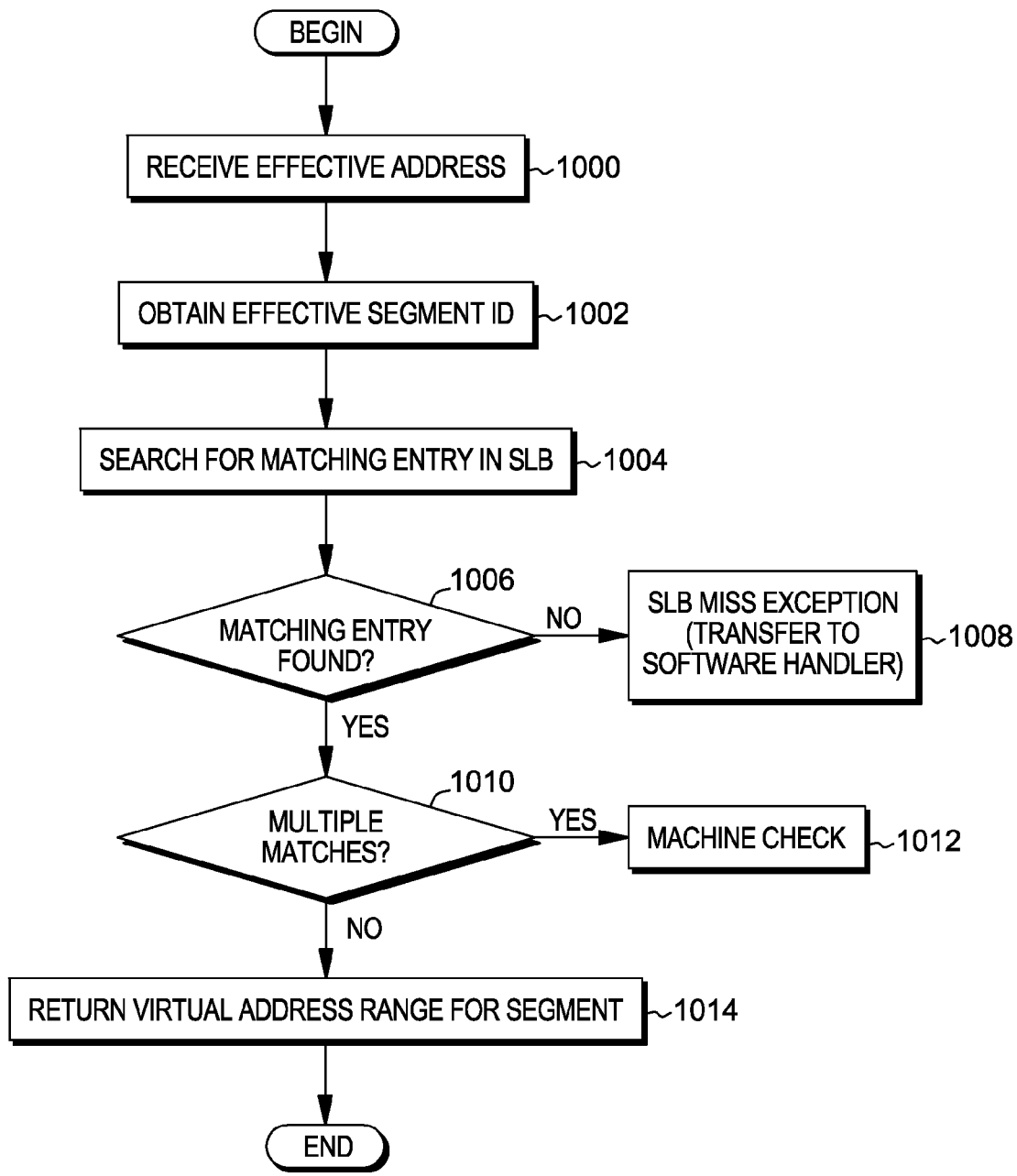
FIG. 10 depicts one embodiment of logic to translate an effective address to a virtual address.

Further details regarding translating from the effective address to the virtual address, by, for instance, the MMU are described with reference to FIGS. 10 and 11. Referring initially to FIG. 10, the MMU receives an effective address via, for instance, an address translation request sent from a particular unit (e.g., instruction fetch, load/store unit) of the CPU, STEP 1000. Based on receiving the effective address, the MMU determines whether the address is for an instruction fetch or a data access. This can be determined, in one example, based on which unit (e.g., fetch unit or load/store unit of the CPU) the MMU received the address translation request or by an indicator associated with the request, as examples. For instance, if the address translation request came from the fetch unit, then it is assumed that the request is for an instruction fetch, and if it came from the load/store unit, it is assumed it is for a data access. Based on receiving the effective address, the MMU obtains an effective segment identifier from the effective address, STEP 1002. The MMU then uses the effective segment identifier to search a segment lookaside buffer for a matching entry, STEP 1004.

Figure 11:
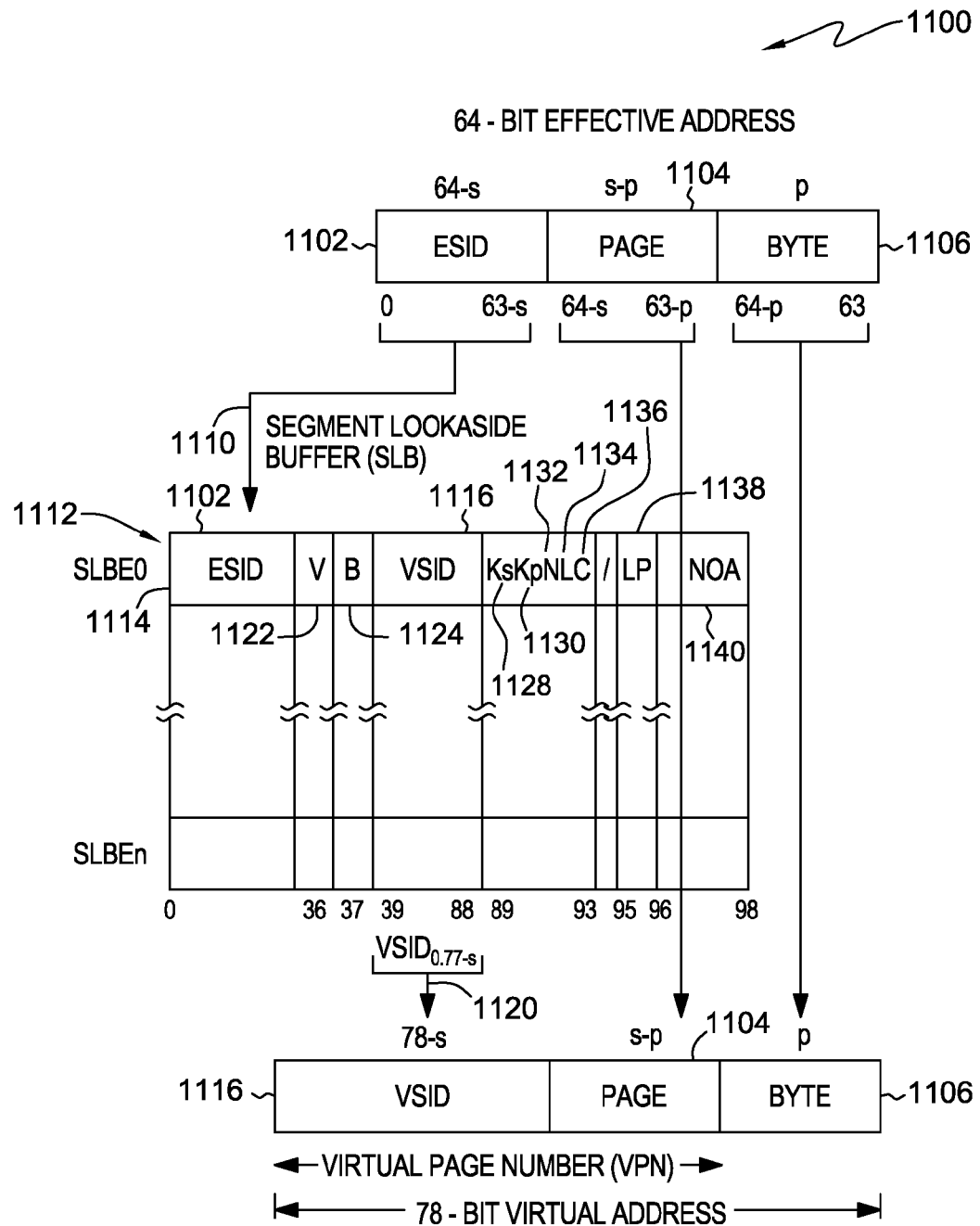
FIG. 11 pictorially depicts one embodiment of translating an effective address to a virtual address.

In particular, as shown in FIG. 11, in one embodiment, an effective address 1100 is a 64-bit address including an effective segment identifier (ESID) 1102, a page offset 1104, and a byte offset 1106. The effective segment identifier is extracted 1110 from the effective address and used to search a segment lookaside buffer (SLB) 1112 for a matching entry 1114. A segment lookaside buffer (SLB) 1112 is a cache of recently accessed segment ID entries. In one example, it is located in the MMU, but in other examples, it is located elsewhere. It specifies the mapping between effective segment IDs (ESIDs) and virtual segment IDs (VSIDs). The number of SLB entries (SLBE) in an SLB is implementation dependent, and in one example, includes at least 32 entries. In one example, segment lookaside buffer 1112 includes a plurality of SLB entries 1114, and each SLB entry 1114 maps one ESID 1102 to one VSID 1116. In one example, SLBE 1114 includes the following fields:

Effective segment ID (ESID) 1102 (bits 0-35);
Entry valid indicator (V) 1122 (bit 36) which indicates whether the entry is valid (V=1) or invalid (V=0);
Segment size selector (B) 1124 (bits 37-38), which has the following meaning, in one example: 0b00—256 Megabytes (MB) (s=28); 0b01—1 Terabyte (TB) (s=40); 0b10—256 TB (s=48); and 0b11—reserved;
Virtual segment ID (VSID) 1116 (bits 39-88);
Supervisor (privileged) state storage key indicator ($K_s$) 1128 (bit 89);
Problem state storage key indicator ($K_p$) 1130 (bit 90);
No-execute segment if N=1 indicator (N) 1132 (bit 91). Instructions cannot be executed from a No-execute (N=1) segment;
Virtual page size selector bit 0 (L) 1134 (bit 92);
Class indicator (C) 1136 (bit 93);
The Class field of the SLBE is used in conjunction with, for instance, slbie (SLB invalidate entry) and slbia (SLB invalidate all) instructions. "Class" refers to a grouping of SLB entries and implementation-specific lookaside information so that only entries in a certain group need be invalidated and others might be preserved. The Class value assigned to an implementation-specific lookaside entry derived from the SLB entry is to match the Class value of that SLB entry. The Class value assigned to an implementation-specific lookaside entry that is not derived from an SLB entry (such as real mode address "translations") is 0.
Virtual page size selector bits 1:2 (LP) 1138 (bits 95-96);
Segments may contain a mixture of page sizes. The L and LP bits specify the base virtual page size that the segment may contain. The $SLB_{L,LP}$ encoding are those shown below, in one example. The base virtual page size (also referred to as the "base page size") is the smallest virtual page size for the segment. The base virtual page size is $2^b$ bytes. The actual virtual page size (also referred to as the "actual page size" or "virtual page size") is specified by $PTE_{L||LP}$, where || is a concatenation of the two values.

| Encoding | Page Size |
|---|---|
| 0b000 | 4 KB |
| 0b101 | 64 KB |
| additional values[1] | $2^b$ bytes, where b >12 and b may differ among encoding values |

[1]In one embodiment, the "additional values" are implementation-dependent, as are the corresponding base virtual page sizes. Any values that are not supported by a given implementation are reserved in that implementation, in at least one embodiment.

No Access (NOA) indicator 1140 (bits 97:98), which $NOA_0$=No Instruction (NOI); $NOA_1$=No Data (NOD); 0b00—SLBE can be used for both instruction fetches and data accesses; 0b01—SLBE can only be used for instruction fetches; 0b10—SLBE can only be used for data accesses; and 0b11 reserved.

For each SLB entry, software is to ensure the following requirements are satisfied.
L||LP contains a value supported by the implementation.
The base virtual page size selected by the L and LP fields does not exceed the segment size selected by the B field.
If s=40, the following bits of the SLB entry contain 0s.
$ESID_{24:35}$
$VSID_{39:49}$ The bits in the above two items are ignored by the processor.

In accordance with one aspect, the NOA field specifies for each SLB entry whether the SLB entry is to be used to translate an effective memory address to a virtual address for instruction fetch and data access (NOA=0b00, in one encoding of allowed accesses for a segment in accordance with one aspect), for data accesses but not instruction fetch (NOA=0b10, in one encoding of allowed accesses for a segment in accordance with one aspect), and for instruction fetch but not data access (NOA=0b01, in one encoding of allowed accesses for a segment in accordance with one aspect).

It is legal to have multiple effective to virtual segment id translations, as long as only one is selected to be performed based on the NOA bits. To accomplish this, software is to ensure that the SLB contains at most one entry that translates a given instruction effective address, and that if the SLB contains an entry that translates a given instruction effective address ($NOA_0$=0), then no other entry can translate the same address for instruction fetches. In accordance with one aspect, when installing a new SLB entry for one or more access modes (e.g., instruction fetch), software is to ensure that any previously existing SLB translation entry of that effective address that may translate an address for such access mode has been invalidated. Likewise, software is to ensure that the SLB contains at most one entry that translates a given data effective address ($NOA_1$=0), and that if the SLB contains an entry that translates a given data effective address, then any previously existing translation of that effective address for data accesses has been invalidated. An attempt to create an SLB entry that violates these requirements may cause a machine check. In accordance with one embodiment, a machine check is a high priority interrupt to a firmware, hypervisor or other supervisor component to indicate that system integrity constraints have been violated.

In accordance with one embodiment, it is permissible for software to replace the contents of a valid SLB entry without invalidating the translation specified by that entry provided the specified restrictions are followed.

When the hardware searches the SLB, all entries are tested for a match with the effective address (EA). For a match to exist, the following conditions are to be satisfied for indicated fields in the SLBE.
V=1 (i.e., the valid bit is set for an entry)
$ESID_{0:63-s}=EA_{0:63-s}$, where the value of s is specified by the B field in the SLBE being tested.
The search is an instruction address search and NOI=0, or the search is a data address search and NOD=0.

In particular, in one embodiment, an entry in the SLB is matching if the entry is valid, has an effective segment identifier matching the obtained effective segment identifier from the effective address, and the No Access (NOA) SLB field is set for the type of memory access being performed, e.g., for an instruction fetch or a data access. The NOA includes, for instance, two bits, in which a value of 01 indicates an address can be used to match addresses associated with instruction access only; 10 indicates an entry can be used to match addresses associated with data access only; and 00 indicates an entry can be used to match addresses associated with both instruction fetches and data accesses. If the NOA field is set for the requested access and the effective SID is the same as the obtained effective SID, then there is a match.

Returning to FIG. 10, a determination is made as to whether a matching entry in the SLB was found, INQUIRY 1006. In particular, the matching logic is performed in conjunction with the NOA field of FIG. 11 indicating the types of accesses each particular SLBE may translate. If no matching entry was found, then there is indicated an SLB miss exception, which transfers control to a software handler for handling the exception, STEP 1008. In at least one embodiment, the software handler manages the SLB as a cache and reloads a new SLB entry (SLBE) from a table of SLBEs maintained in memory. If, however, a matching entry is found, INQUIRY 1006, then a determination is made as to whether multiple matching entries were found, INQUIRY 1010. If there are multiple matches, a machine check may be taken, STEP 1012, since there should not be multiple matches, or in another embodiment, one of the entries is selected and used.

However, if there is one match (or one is selected), a virtual segment identifier (VSID) 1116 (FIG. 11) in the SLB entry is extracted 1120 and used as part of the virtual address. The VSID is concatenated with page offset 1104 and byte offset 1106 from the effective address to create the virtual address. This virtual address is then returned, STEP 1014 (FIG. 10).

As described above, for the SLB search, if no match is found, the search fails. If one match is found, the search succeeds. If more than one match is found, one of the matching entries may be used as if it were the only matching entry, or a machine check occurs. If the SLB search succeeds, the virtual address (VA) is formed from the EA and the matching SLB entry fields as follows: $VA=VSID_{0:77-s}\|EA_{64-s:63}$. The Virtual Page Number (VPN) is bits $0:77-p$ of the virtual address. The value of p is the actual virtual page size specified by the PTE used to translate the virtual address. If $SLBE_N=1$, the N (no execute) value used for the storage access is 1.

On an instruction fetch, if $SLBE_N=1$, an Instruction Storage interrupt may occur without the page table being searched. If the SLB search fails, a segment fault occurs. This is an instruction segment exception or a data segment exception, depending on whether the effective address is for an instruction fetch or for a data access.

The virtual address created from translation of the effective address is then translated to a physical address (a.k.a., a real address) using, for instance, a hash page table. Further details regarding translation using a hash page table are described with reference to FIG. 12.

Figure 12:
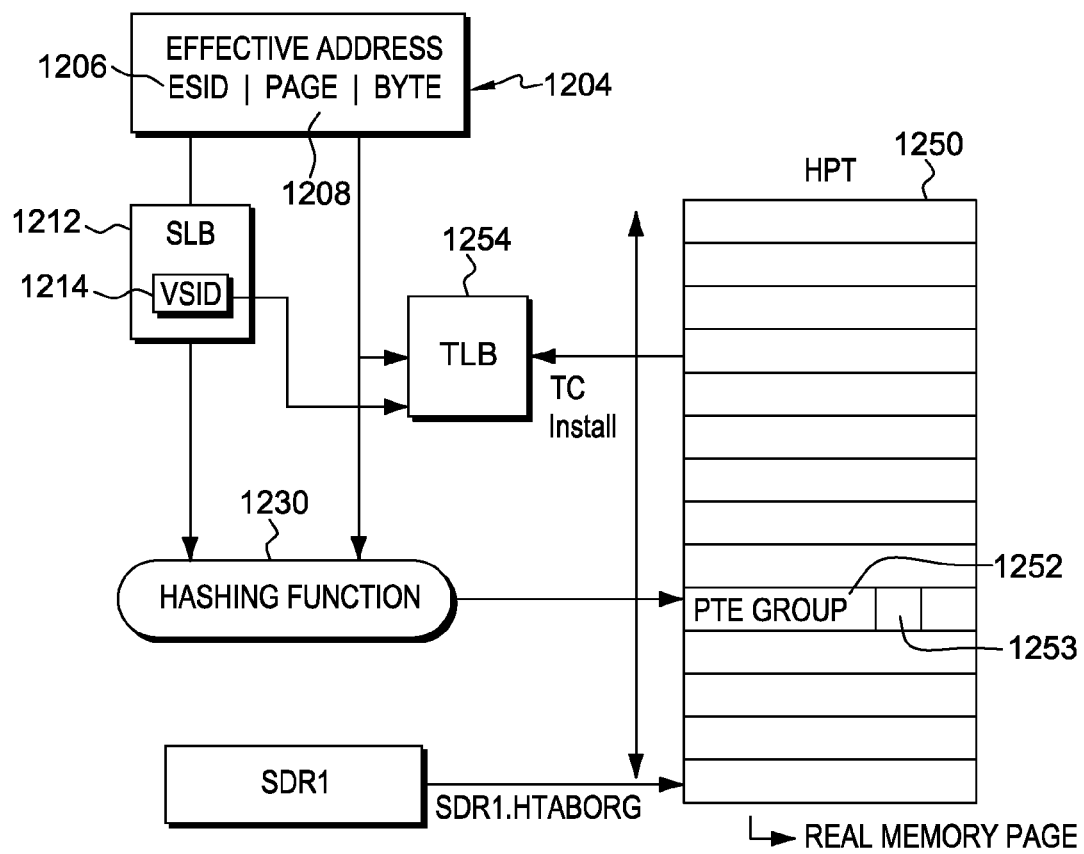
FIG. 12 depicts one example of a hash page table translation structure.

In particular, FIG. 12 illustrates one example of a hash page table (HPT) translation structure used by POWER ISA. ESID portion 1206 of an effective address (EA) 1204 is used to locate an entry in SLB 1212. The entry includes a VSID field 1214. The value of VSID field 1214 and the page portion 1208 of EA 1204 are hashed 1230 to produce a hash value that is used to locate a page table entry (PTE) group 1252 in a hash page table (HPT) 1250. (In another embodiment, since the virtual address was previously created, the VSID and page portion may be extracted directly from the formed virtual address.) In at least one embodiment, the hash page table is located by a page table origin address provided by the processor. Page table entries 1253 of PTE group 1252 are searched to locate a corresponding PTE having a field matching a value of a most-significant-portion of the VSID. When a corresponding PTE is found, the address (e.g., real address) of the physical memory page in the PTE is used to access physical memory. In order to improve performance, once a PTE entry is found, the page portion 1208 of EA 1204 and the address of the physical memory page found in the PTE are stored in TLB 1254, such that further accesses to the same EA page will "hit" in TLB 1254 and avoid the PTE search.

As described above, in one example, address translation is performed based on a particular attribute, such as, for instance, the type of access: instruction fetch or data access. To enable this, a mechanism is provided that includes a field in the SLB to prevent SLBEs from being used for instruction-side or data-side accesses. This field, as indicated above, is the No Access (NOA) field. The NOA is used to indicate that a particular SLBE associated with the NOA can be used for only instruction fetches, only data accesses, or for both instruction fetches and data accesses (e.g., when the code is not modified).

In accordance with one embodiment, the NOA field is separately specified for each segment in conjunction with an SLB entry, thereby allowing some effective address segments (memory regions of the input address) to be translated to a common segment address for instruction and data accesses (memory regions of the output address), and other segments (memory regions of the input address) to be translated to separate segment addresses for instruction and data accesses (memory regions of the output address), respectively, or to provide a translation for one type of access (e.g., instruction access), but not another type of access (e.g., data access) by loading an appropriate SLB entry for one type of access, but not another. While the description has been made with respect to the presence of a NO Access field, and to a specific encoding of a NO Access field in the SLB, it is understood that other fields, other encodings for such fields, or both, may be used to identify the types of permissible access for a translation.

Figure 13:
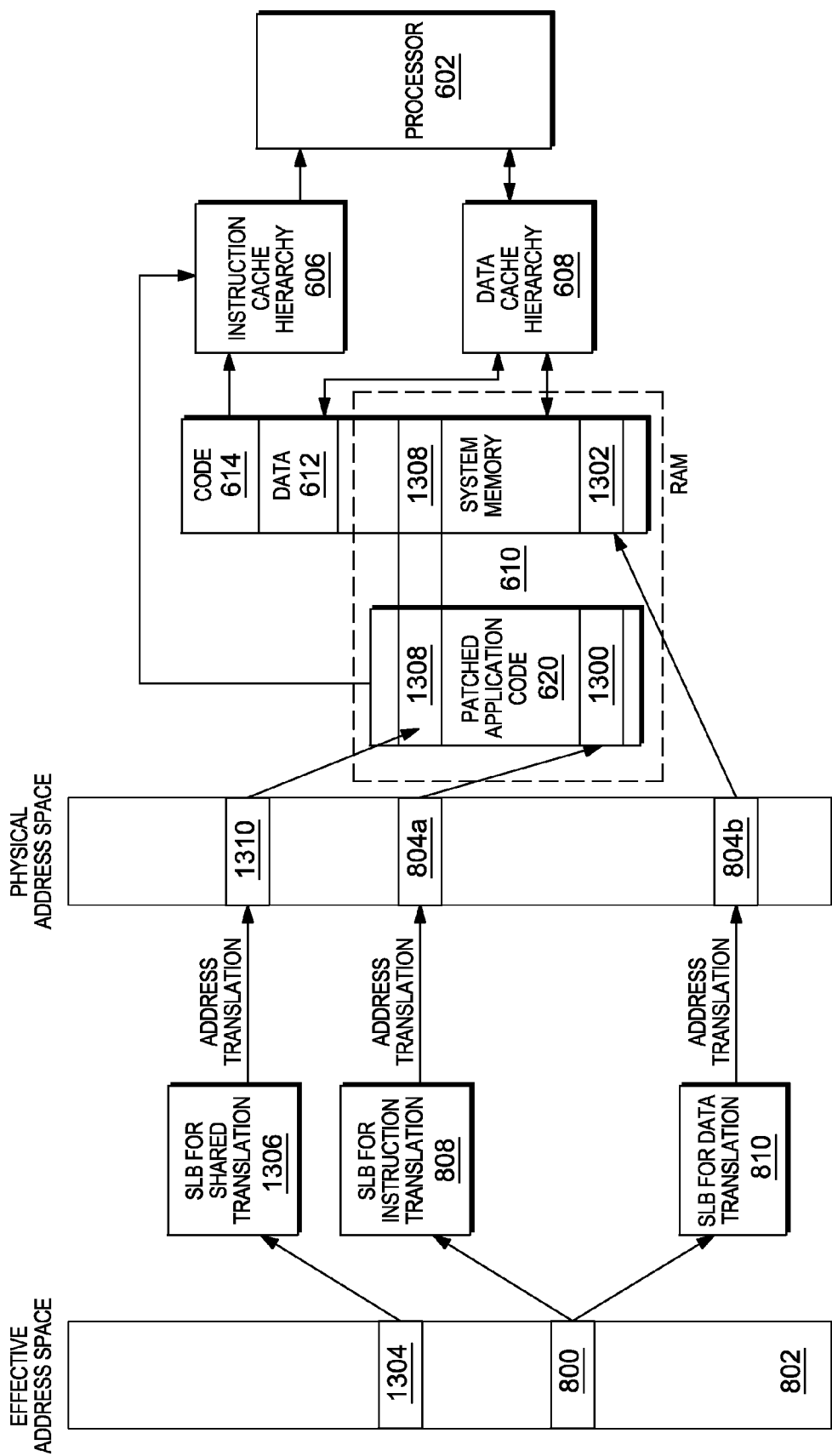
FIG. 13 depicts one example of an effective address being translated to separate physical addresses.

As described herein, in accordance with one or more aspects, the separate instruction/data address translation technique is used to redirect address translation to a particular region of memory that includes modified code for instruction fetches and another region of memory that includes the unmodified code for data accesses, as shown in FIG. 13.

Referring to FIG. 13, in one example, patched application code 620 includes a modified portion, and that modified portion is stored in one or more memory regions 1300 of system memory 610. The unmodified portion (corresponding to the modified portion) continues to be in other memory regions 1302 of system memory 610. In particular, the other memory regions 1302 include that application code prior to modification.

In this embodiment, an effective address 800 is used to access memory region 1300 or memory region 1302 depending on whether the address translation is for an instruction fetch 808 for a modified portion or a data access 810 for an unmodified portion. If, for instance, the translation is for an instruction fetch of a modified portion, then effective address 800 is translated to physical address 804*a*, which points to memory region 1300 that includes the modified code. However, if the address translation is for a data access, then effective address 800 is translated to physical address 804*b*, which points to memory region 1302, which includes the unmodified, pre-existing or original code that corresponds to the modified code.

In a further embodiment, an effective address 1304 may use a shared translation 1306, in which a same memory region 1308 is used for an instruction fetch and a data access (since, for instance, that code portion has not been modified). In this example, effective address 1304 is translated to a physical address 1310, which points to memory region 1308.

Figure 14:
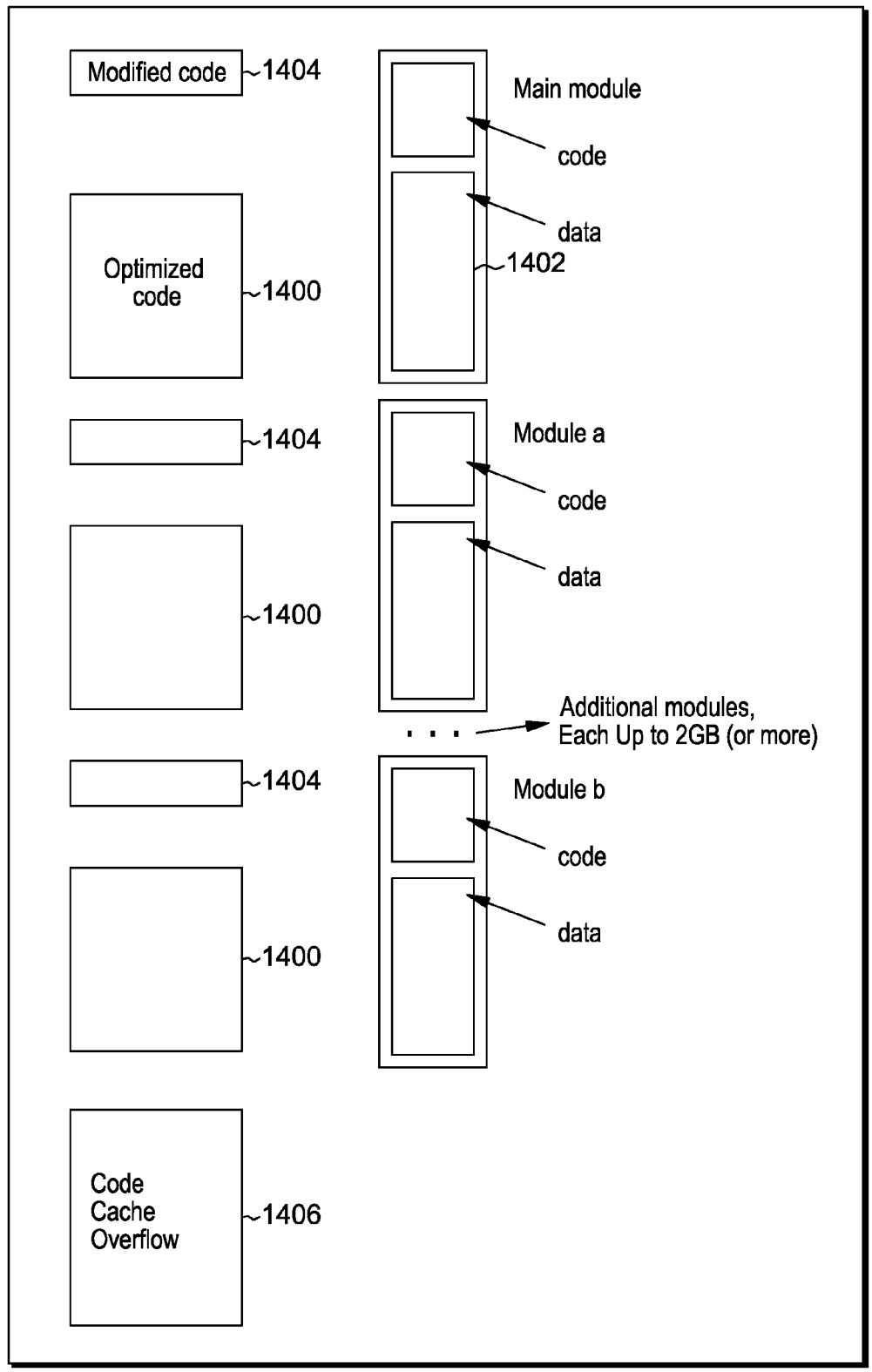
FIG. 14 depicts one example of overlaying a data space of a module with optimized code of that module.

In one aspect, when optimized code is created, the optimized code cache is stored such that it overlays the module's data space to provide a short displacement distance to the data. For instance, as shown in FIG. 14, optimized code 1400 overlays corresponding data space 1402 of the original module. Then, the data is close to the code, so offsets determined based on the new location can be used to access the data. In this example, separate instruction access is used to access code 1400, and data accesses are used to access data 1402. Further, modified code 1404 is provided that includes the branches to/from code cache 1400. Additionally, in one embodiment, a code cache overflow area 1406 is provided.

Code cache overflow area 1406 is used when the code caches 1400—these caches being limited by the preexisting data size 1402—are insufficient in size to hold all generated optimized code.

Figure 15:
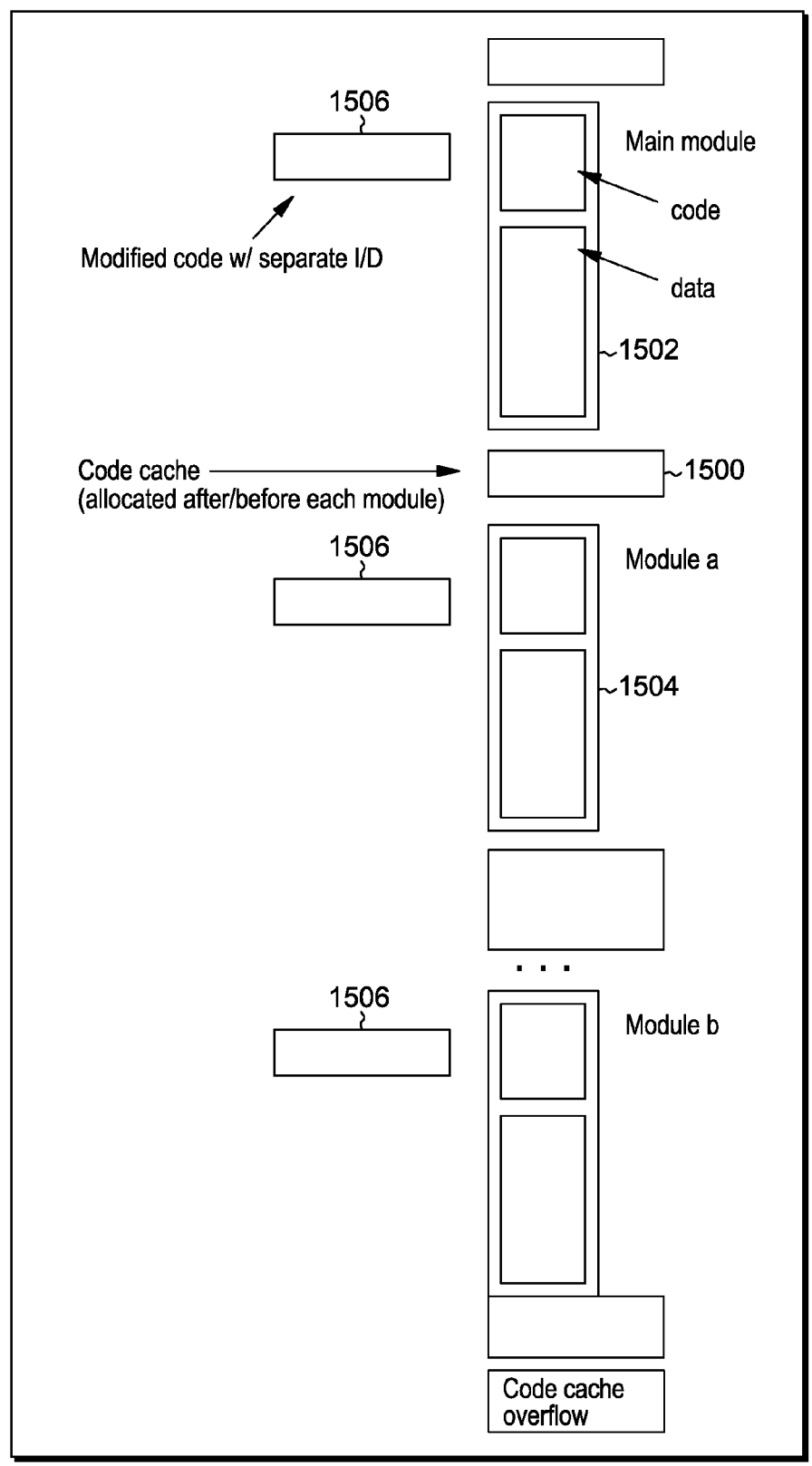
FIG. 15 depicts one example of loading optimized code before and/or after modules of an application.

In a further embodiment, as shown in FIG. 15, a code cache is created, based, e.g., on optimization, and is loaded between the original modules, which enables easy access to the data. That is, the code cache is allocated after or before the module corresponding to the code cache. For instance, a code cache 1500 is allocated in space after main module 1502 and before module 1504. That code cache includes optimized code corresponding to the code of module 1502. Then, the data is close to the code, so offsets determined based on the new location can be used to access the data. In this example, separate instruction and data access may be used to access code 1500, and data accesses are used to access the data of module 1502. Further, modified code 1506 is provided that includes the branches to/from code cache 1500.

Although the above embodiments describe overlaying the data space with optimized code and placing optimized code before/after the modules, the code that overlays or is placed before/after the modules may be relocated code other than optimized code.

In one example, the embodiment of FIG. 14 does not impact the loading addresses of modules by inserting code cache areas 1500 between modules, but uses a hardware system implementing an architecture providing support for separate instruction and data address translation. The embodiment of FIG. 15 can also be used in conjunction with a hardware system implementing an architecture not providing support for separate instruction and data address translation, when patching branches are directly injected into the instruction code of the main module, and modules a, b, and so forth (but typically without providing self-referential integrity), when code caches 1500 and code cache overflow area are accessible for instruction and data accesses.

Figure 16:
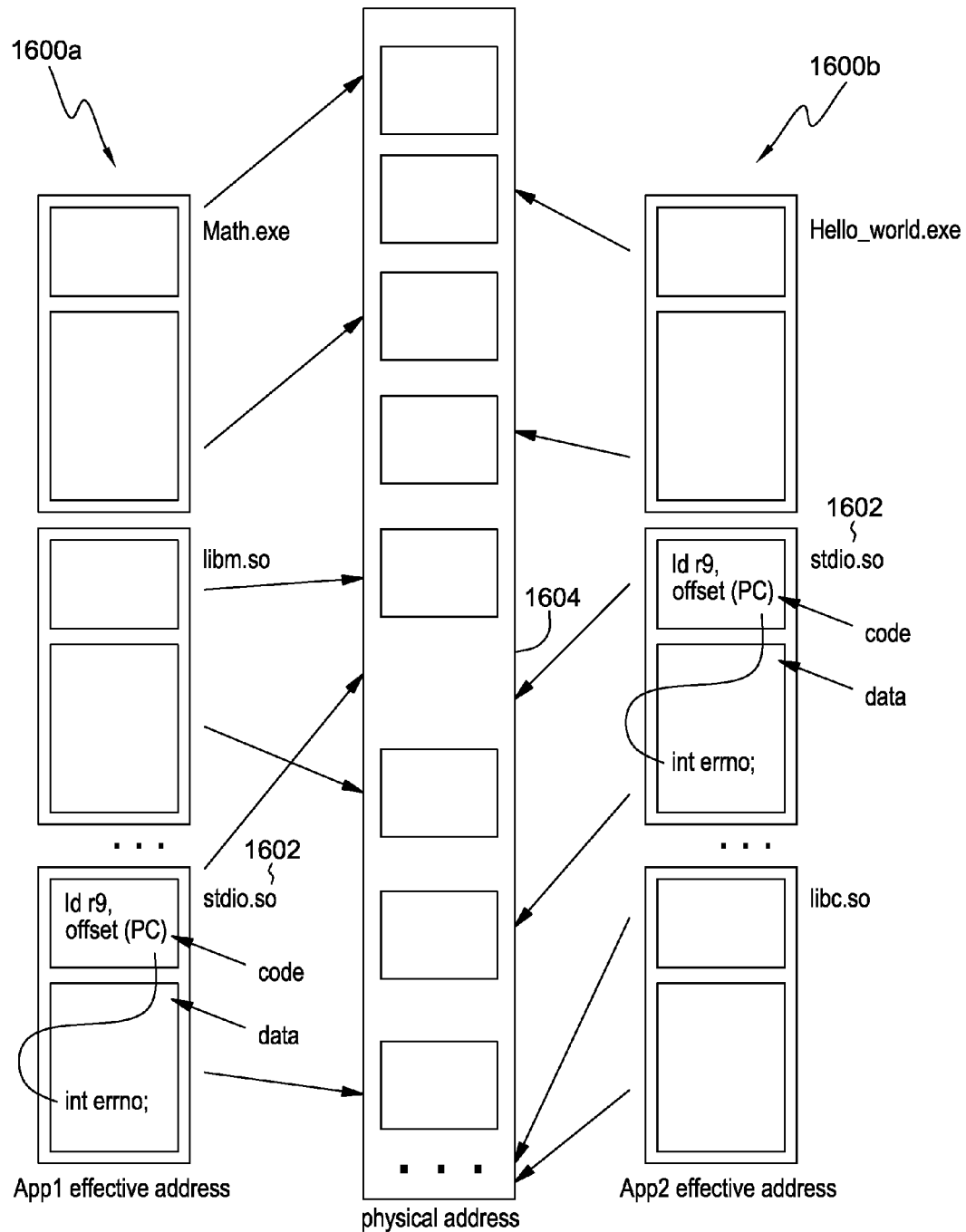
FIG. 16 depicts one example of sharing a library.

In addition to the above, one or more further aspects relate to shared libraries, which are often written as position-independent code with PC-relative addressing. This enables a library to be loaded in different locations. For instance, as shown in FIG. 16, two applications, math.exe. 1600a, and hello world.exe 1600b—loaded into two distinct address spaces (App1 effective address space and App2 effective address space) and mapped via address translation to one common physical memory area addressed with common physical addresses generated by address translation of a system—share a library, stdio.so 1602. In this example, the shared library is loaded at different addresses, but loaded such that the instruction code is sharing the same code memory in physical memory as shown at 1604. In yet a further embodiment, the library is shared, but loaded at different locations in the physical address space.

Figure 17:
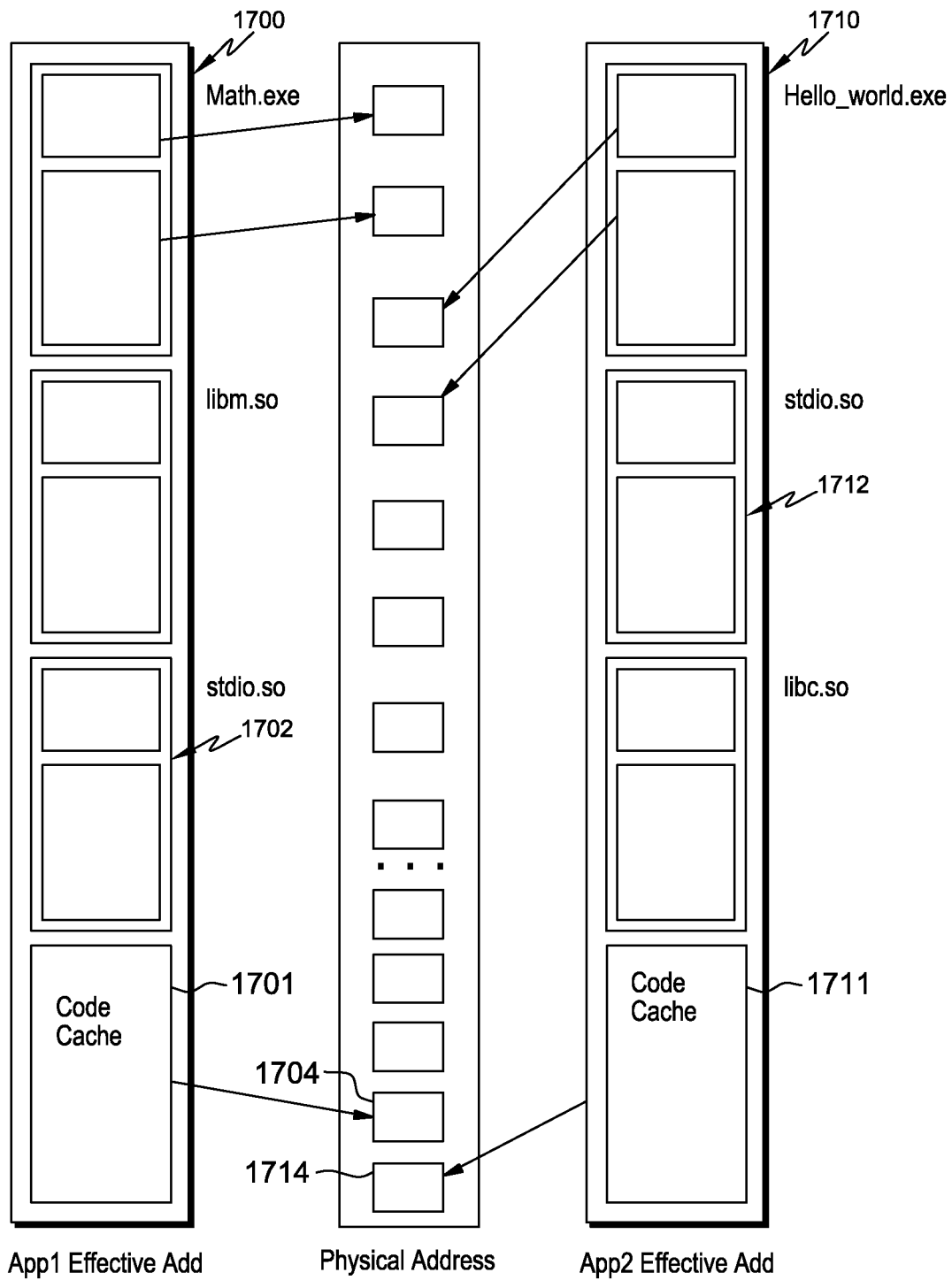
FIG. 17 depicts one example of optimized code of a shared library being loaded at different physical addresses for different applications.

Referring to FIG. 17, in one example, a library, such as stdio.so, is shared, but when optimized, the optimized code cache is separate for each application. That is, in one example, for application 1700, the optimized code cache 1701 for stdio.so 1702 is at physical address 1704; and for application 1710, the optimized code cache 1711 for stdio.so 1712 is at physical address 1714. In this example, applications share unmodified code in common memory areas, but each application has a distinct and unshared optimized code cache 1701 and 1711 corresponding to separate physical memory used by a code component such as a dynamic code optimizer (or translator) to store code optimized specifically for the application corresponding to the code cache.

In yet another embodiment, the dynamic optimizer shares the translated code, but the translated code for the same library is loaded at different locations.

Figure 18:
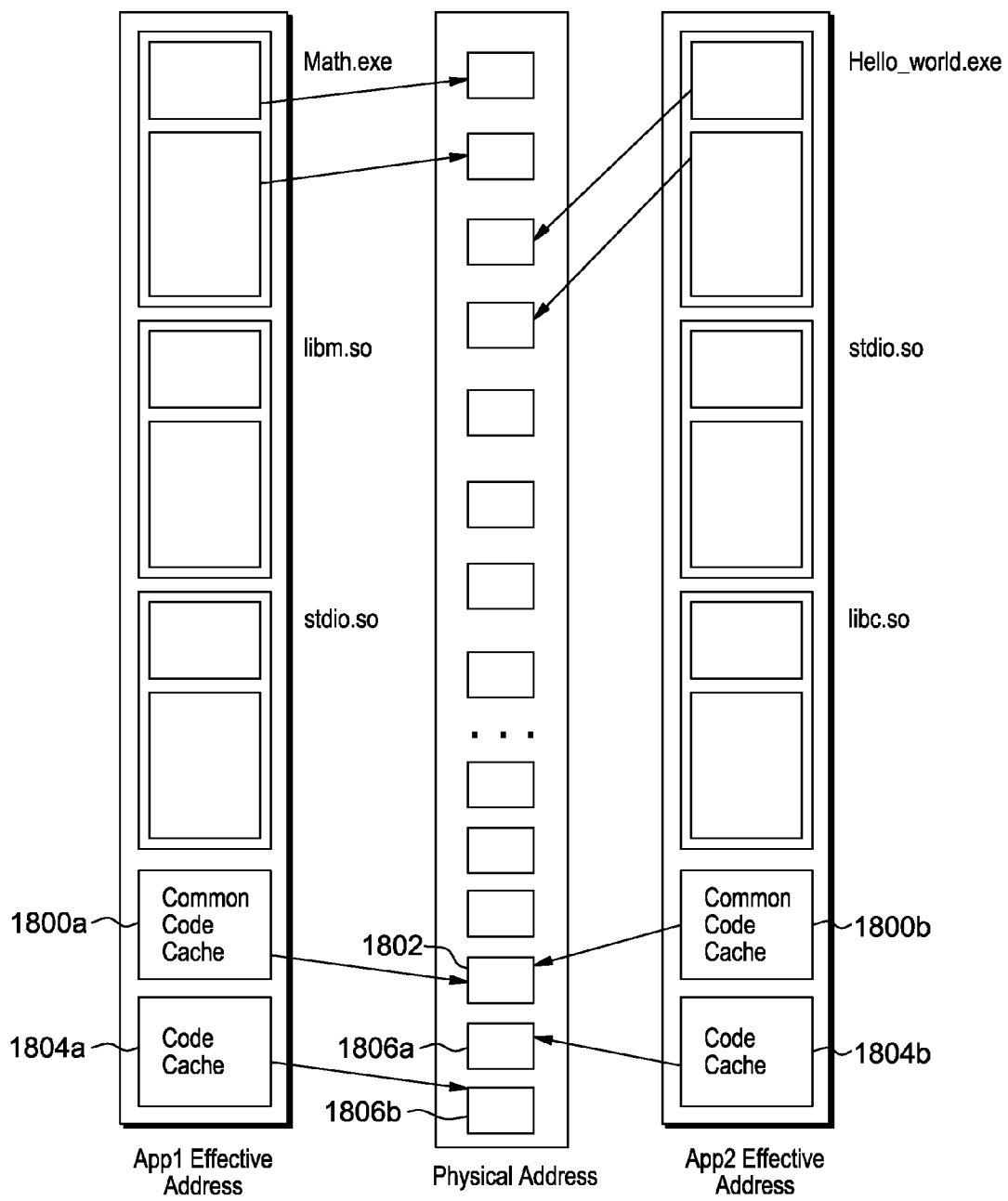
FIG. 18 depicts one example of using a common code cache for optimized code of shared libraries.

In a further embodiment, the code cache for translated and/or optimized libraries is shared, as depicted in FIG. 18. As shown, in this particular example, a common code cache 1800a, 1800b is provided to share the code cache for optimized libraries. The common code cache points to the same physical location 1802. In this example, also are shown individual code caches 1804a, 1804b, with translated code, but at different physical addresses 1806a, 1086b.

In one embodiment, if using the common code cache, the data for the library is accessed using, for instance, a base register. For example, a general purpose register holds a base register value from, e.g., a CFAR, a target address register (TAR) or another special purpose register. For example, a load instruction may be used, such as LD r9, disp (CFAR), or LD r9, disp(TAR). In one embodiment, a CFAR register points to an original base address of a shared library, such as stdio.so, initialized to the appropriate loading range of stdio.so for each of exemplary application effective address spaces App1 and App2. Further, a TAR register may correspond to a value loaded in the vicinity of a CFAR register and representing a return-to address after the completion of the optimized code sequence.

As yet further embodiments, the common code cache is loaded between modules or overlays the data space of a module, and an offset is used, as described above.

In one embodiment, when a code cache corresponds to one application, absolute and PC-relative accesses are used to reference data corresponding to data in the original module data area. In other embodiments, addressing based on a CFAR, TAR or other address representing a module effective address is used to access data. In such an embodiment, absolute, PC-relative or CFAR/TAR/or other address registers representing a base module load effective address may be used to reference code addresses and optionally data associated to the code cache.

In another embodiment, a shared code cache is provided and the shared code cache has a fixed offset with respect to the original module that is common to all applications sharing a module and a common code cache for the module. In at least one embodiment, a fixed common offset of one or more code caches is achieved, e.g., in accordance with the loading techniques for creating the memory layout of FIGS. 14 and 15; the loading technique of FIG. 14 creating code caches overlaying module loaded data areas, and the loading technique of FIG. 15 creating code caches at a fixed distance—commonly the distance being 0—directly before the code area or after the data area of the loaded module. In one embodiment, these areas are immediately allocated when a module is loaded. In another embodiment, a defined memory region is set aside for later allocation of a code cache thereto. In such an embodiment, PC-relative accesses are used to reference data corresponding to data in the original module data area. In other embodiments, addressing based on a CFAR, TAR or other address representing a module effective address is used to access data. In such an embodiment, PC-relative or CFAR/TAR/or other address registers representing a base module load effective address may be used to reference code addresses and optionally data associated to the code cache.

In an embodiment when a code cache is shared and loaded to the same effective address area 1800a and 1800b in a plurality of application effective address spaces (such as the app1 and app2 effective address space of the examples of FIG. 18), the distance from the code cache to the addresses used by each application is known, and absolute and pc-relative accesses are used to reference data corresponding to data in the original module data area, but, in one embodiment, multiple alternate code paths are generated for each address space. In other embodiments, addressing based on a CFAR, TAR or another base register (e.g., a TOC (Table of Contents—a data dictionary that includes addresses of global variables referenced by one or more programs and possibly data); GOT (Global Offset Table—a data dictionary that includes addresses of global variables referenced by one or more programs); or other register pointing into a module's data section) representing a module effective load address for the specific application is used to access data. In such an embodiment, the register plus displacement or PC-relative addresses may be used to reference code addresses and optionally data associated to the code cache.

In at least one embodiment, a dynamic optimizer optimizes a plurality of applications. The dynamic optimizer recognizes, e.g., the same library is being optimized in several applications. In one such embodiment, a common dynamic optimizer is used to optimize multiple applications in multiple application effective address spaces. In another such embodiment, multiple dynamic optimizers are used to optimize multiple applications in multiple application effective address spaces. In such an embodiment, dynamic optimizers (or other such components) collaboratively optimize shared code, e.g., by sharing profile data and designating one dynamic optimizer component to optimize code for a plurality of applications. The collaborative framework between dynamic optimizers is further adapted to interlock such sharing and to make available code generated by one dynamic optimizer to a plurality of application address spaces, some corresponding to a distinct dynamic optimizer instance.

In one embodiment, when a library is optimized, the dynamic optimizer optimizes the library for all applications simultaneously. The optimizer optionally combines execution profiles for hot spots from multiple executions in multiple applications. This reduces the optimization overhead because only one optimization needs to take place, but it benefits multiple applications. However, if the same library has different behaviors corresponding to different applications, the profiles are commingled and the library is not optimized for either one. In at least one embodiment, an optimizer performs analysis to determine if profiles are compatible before deciding to combine/not combine. Analysis can be performed for either an entire library, or on a page by page basis. In at least one embodiment, profile compatibility is determined by determining if the profile corresponds to the same code functions, and if there is a high degree of correlation between profile data for a specific region. In one combination technique, a threshold function is used to determine a minimum necessary correlation to combine profiles. In at least one embodiment, hotter memory regions are required to have more correlation. In at least one other embodiment, profiles are weighted by relative hotness when they are combined. If combined, code is generated once, and written to a physical page.

Figure 19A:
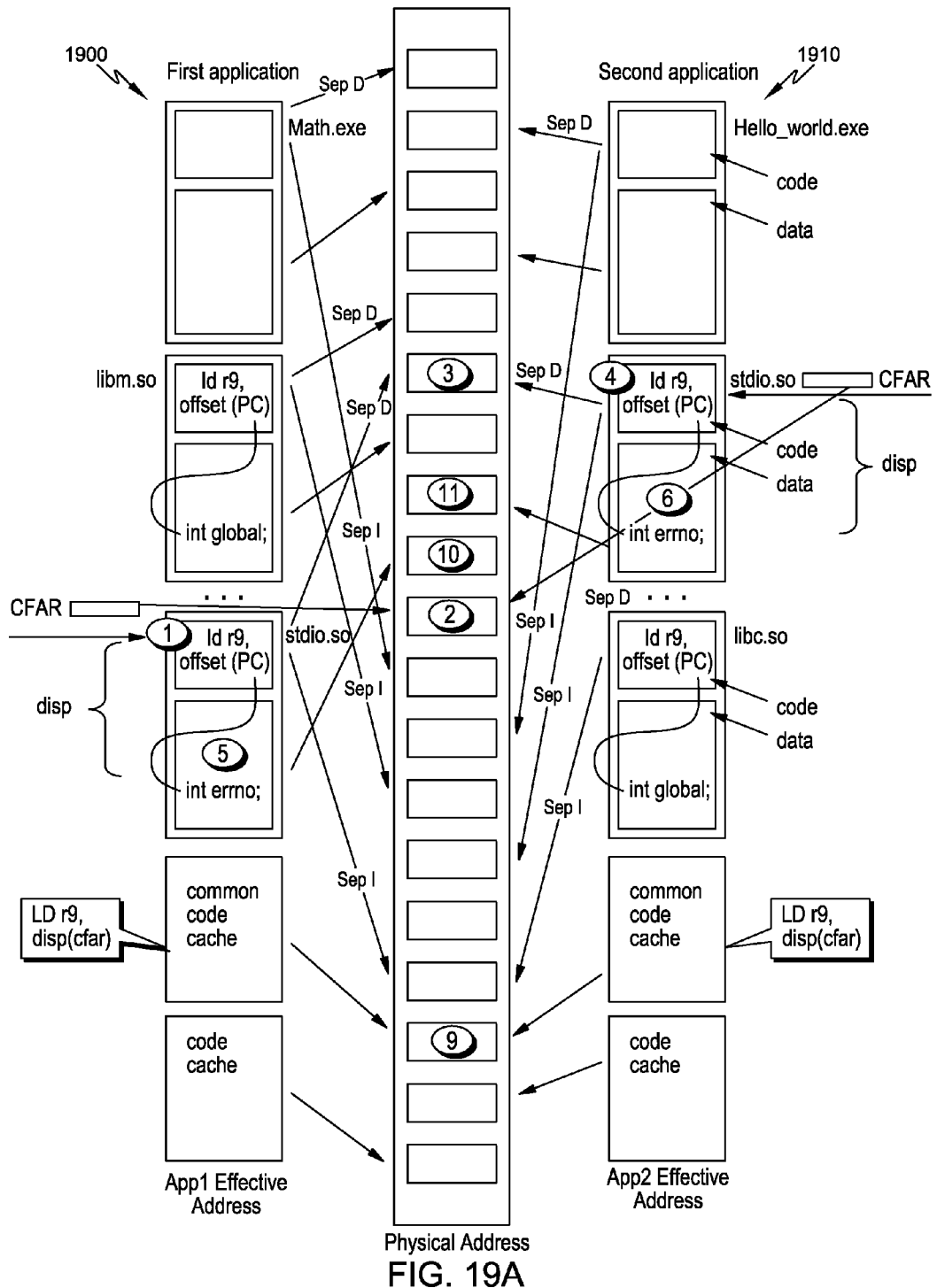
FIG. 19A-19B depict examples of shared libraries, shared library code cache and use of base registers in addressing.
Figure 19B:
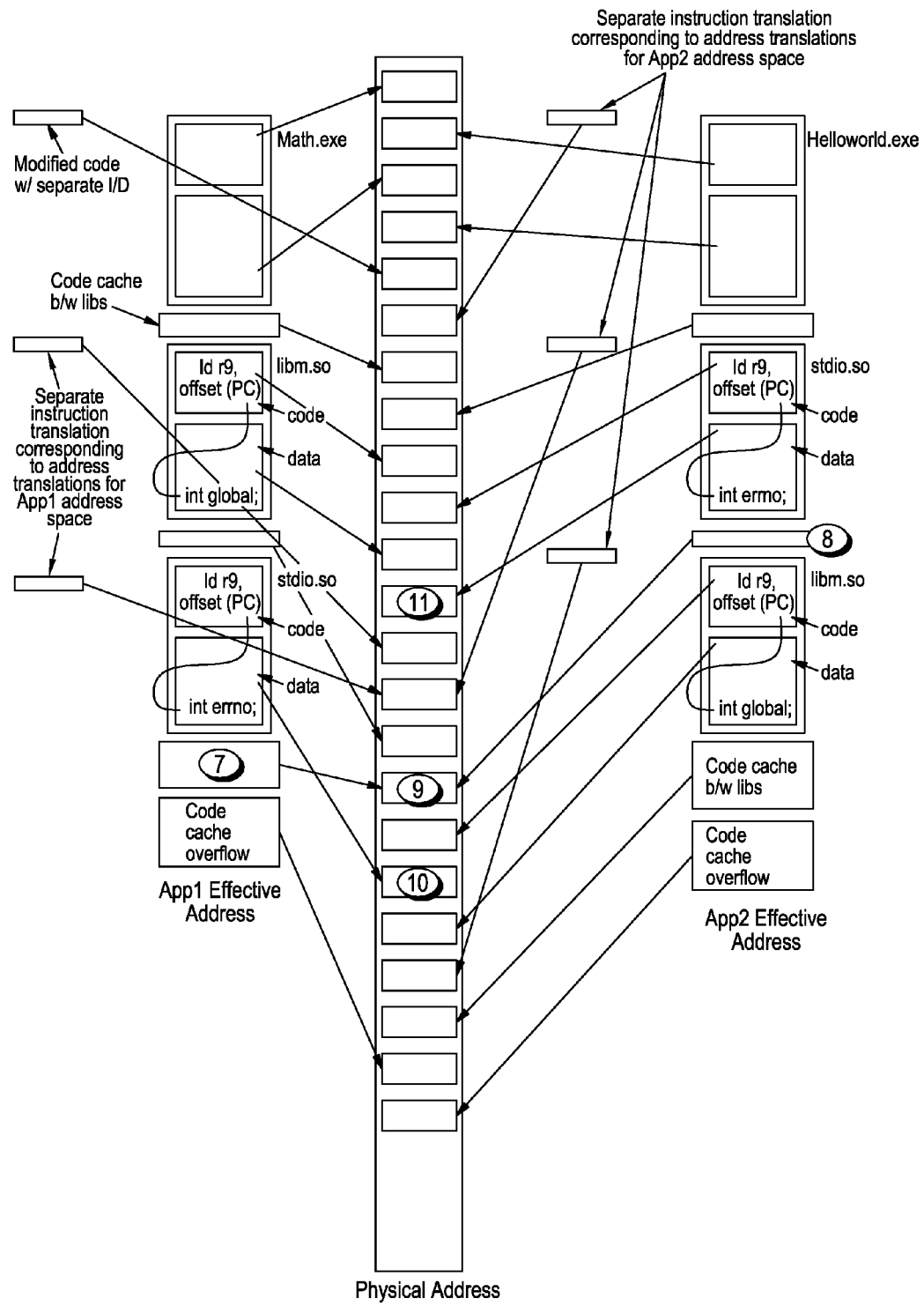

In one or more aspects, FIG. 19A for example corresponds to an application memory layout of FIG. 18; and FIG. 19B, for example. corresponds to an application memory layout of FIG. 15 with each of a first and a second application of a first and a second application effective address space corresponding to the application effective address space layout of FIG. 15 for a single application address space being further adapted to share unmodified code and optimized code in a physical memory. Those skilled in the art will be able to use the techniques used herein to apply to other memory layouts to share unmodified code, and to further share optimized code that is common to more than one application effective address space, the common code having been generated either by a dynamic code generating component directed at optimizing multiple applications in a plurality of application effective address spaces, or by a plurality of dynamic code optimizing components directed at cooperatively generating optimized code for applications sharing modules. In at least one embodiment, in accordance with one or more aspects, code sharing for unmodified code and for optimized code may further be combined with data sharing using the known copy-on-write data sharing strategy.

Referring to FIGS. 19A-19B, address translation is set to: In a first application 1900 (FIG. 19A), translate a first address (#1) of the first application for instruction access to a second address (#2) holding modified (merged) optimized library code. In the first application, translate the first address (#1) for data access to a third address (#3) holding unmodified library code. In a second application 1910, translate a fourth address (#4) of the second application for instruction access to the second address (#2) holding modified (merged) optimized library code. In the second application, translate the fourth address for data access to the third address (#3) holding unmodified application code.

The first application code further makes reference to data in a fifth address (#5) of the first application, and the second application refers to data in a sixth address (#6) of the second application. The first application further has optimized library code in an address placed adjacent to the loaded library in a seventh address (#7) (FIG. 19B) of the first application, and the second application has optimized library code in an address placed adjacent to the loaded library in an eighth address (#8) of the second application, the seventh and eighth addresses pointing to a ninth address (#9) of a different address type (e.g., a real address vs. an effective address).

The first application further has optimized library code using instruction only access for the fifth address (#5) (FIG. 19A) of the first application, when the data of the first application is accessed using data only translation, and the second application further has optimized library code using instruction only access for the sixth address (#6) of the second application, when the data of the second application is accessed using data only translation; the optimized code of the fifth and sixth addresses accessing data of the fifth and sixth addresses of the first and second application, the fifth and sixth address translations for instruction addresses corresponding to a ninth address (#9) of the second address type, the fifth and sixth addresses for data access corresponding to a tenth (#10) and eleventh address (#11) of the second address type.

As described herein, in one or more aspects, a capability is provided to schedule (relocate, move) relative addressing instructions, such as PC-relative instructions, while preserving the validity of the instructions. One embodiment of logic used to perform such a relocation is described with reference to FIG. 20.

Figure 20:
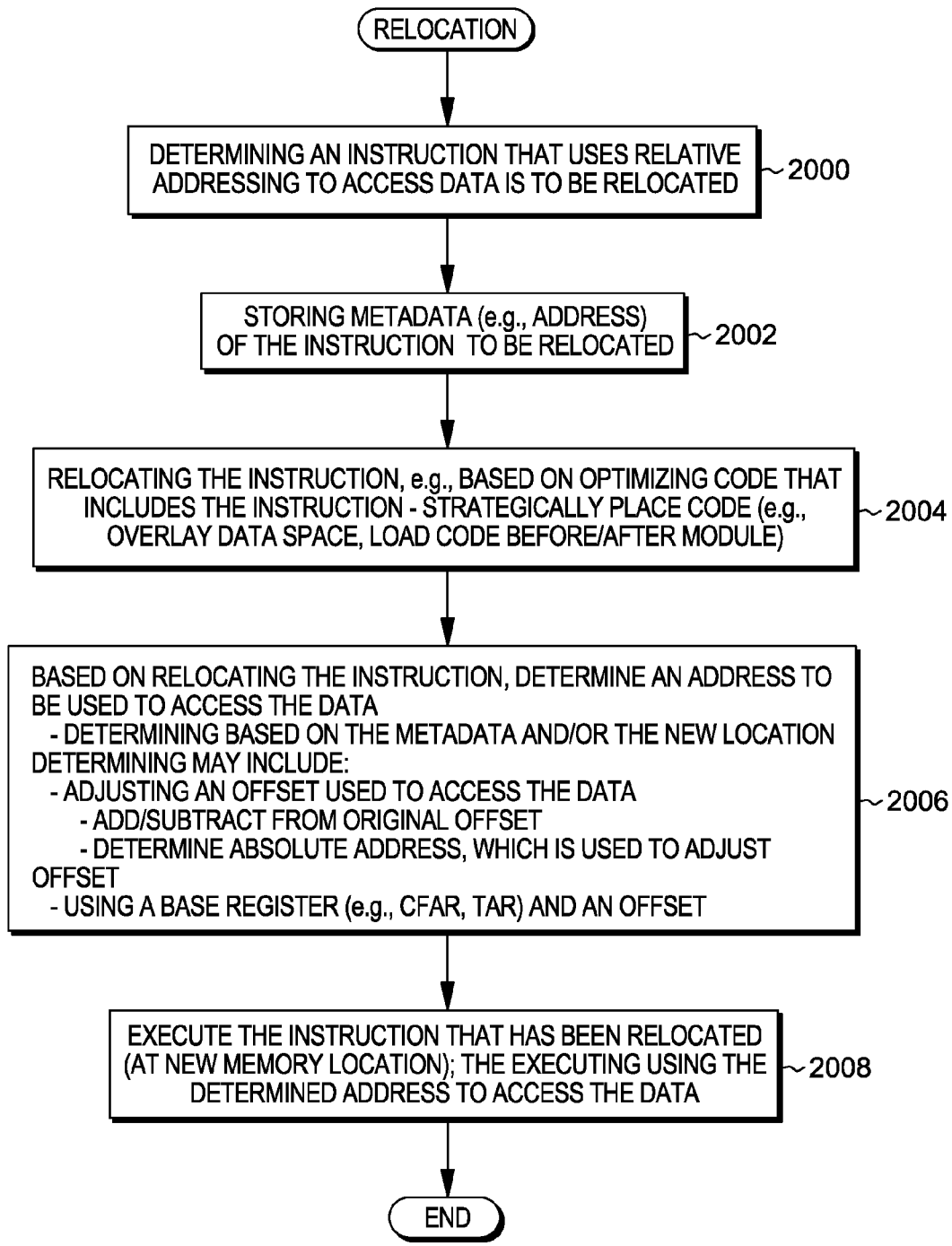
FIG. 20 depicts one example of logic used to relocate instructions that use relative addressing.

Referring to FIG. 20, in one example, a determination is made that an instruction that uses relative addressing to access data is to be relocated, STEP 2000. In one example, this determination is made by an optimizer that determines that the code that includes the instruction is to be optimized for one or more reasons. In other examples, this determination is made based on reasons other than optimization.

Prior to relocating the instruction, metadata associated with the instruction, such as the address of the instruction prior to relocation, is stored, STEP 2002. In other examples, other data may also be stored.

Thereafter, the instruction is relocated, STEP 2004. The instruction is included in code of a module, which includes both code and data. In relocating the instruction, code that includes the instruction, is moved from one or more memory locations to one or more other memory locations, but the data is not moved. In one embodiment, the relocated instruction is included in optimized code, which is strategically placed, such as, e.g., it overlays a data space of the module that includes the instruction or it is loaded before or after that module. Other examples may also exist.

Based on relocating the instruction, a determination is made of an address to be used by the instruction to access the data of the module, STEP 2006. This determination is based on, for instance, the metadata and/or the new location of the instruction. The determining may include, for instance, adjusting an offset used to access the data, such as adding or subtracting from an original offset, or determining an absolute offset, which is used to adjust the offset. Other examples also exist. In a further example, an address of a base register is used, as well as an offset, to determine the address to be used by the instruction to access the data.

The instruction that has been relocated is then executed at the another memory location, and the executing uses the determined address to access the data, STEP 2008.

As described herein, in one example, to accomplish relocation, one or more aspects perform an offset adjustment technique. In accordance with one embodiment of an offset adjustment technique, when scheduling a PC-relative instruction, as one example, the original address of the PC-relative instruction is recorded in conjunction with the address. When scheduling has occurred, in one example, the difference between the original address and the new address is used to adjust the offset used by the PC-relative address.

In another embodiment of an offset adjustment technique, an absolute address for the referenced address is generated and stored with the instruction in lieu of a displacement. When the PC-relative memory instruction has been scheduled, either an absolute reference is used to address the data using the stored absolute address, or a PC-relative address is generated by subtracting the address of the new instruction location of the absolute address stored in conjunction with the PC-relative instruction, as examples.

In accordance with one or more aspects, when rescheduling a PC-relative address instruction to a new address, metadata is saved about the original address and used when executing the PC-relative instruction at the new location to locate the originally specified instruction. In one example, the PC-relative instruction is executed at the new address by using the difference between the old address and the new address to adjust the offset used to reference the data.

In at least one embodiment, a dynamic optimizer optimizes code containing PC-relative accesses. When the code is translated in one example, PC-relative accesses are translated to an internal representation using absolute addresses and without reference to a program counter. In one embodiment, when the optimized code is generated, PC-relative references are generated with an offset computed based on the location of the new instruction. In a further embodiment, when an offset cannot be encoded in an instruction, an indirect reference is performed using an address stored in a data area referenced with a PC-relative access.

In at least one embodiment, the compiler uses a base register instantiated by optimized code. The base register contains an address representing a base within an acceptable distance from the original PC value, such that a displacement can be encoded. The acceptable distance is chosen such that all data values referenced with a valid ISA-supported displacement from respective references in the unmodified code can be referenced with ISA-supported displacement from the chosen base value. As examples, the chosen base value corresponds to one of a value obtained from a CFAR register or a value to be used in conjunction with a TAR branch to return to address corresponding to address of an unmodified application (i.e., not extended code cache).

As one example, the value of the CFAR register or TAR register serves as a proxy for the original PC address, since the instruction loading CFAR or TAR is at a known fixed distance from the original PC regardless of the actual value of the original PC. In one example, the instruction loading CFAR is a fixed number of instructions prior to the PC; and the instruction loading TAR is a fixed number of instructions after the PC. The instructions to load CFAR or TAR are part of the intended use of the code and not added just to provide an address. Thus, no extra load instruction is needed.

In at least one embodiment, extended code cache regions are allocated between each loaded library, such that PC-relative references from modified code (with a valid ISA-specified displacement) in an extended code cache can reach the data referenced by a PC-relative instruction from the expanded code cache.

In at least one embodiment, extended code cache regions are allocated for instruction-only access overlaying data regions accessed by the corresponding application code, when the data regions are configured for data only access mode, i.e., at the same address as data of each library, such that PC-relative references from modified code (with a valid ISA-specified displacement) in an extended code cache can reach the data referenced by a PC-relative instruction from the expanded code cache.

Figure 21:
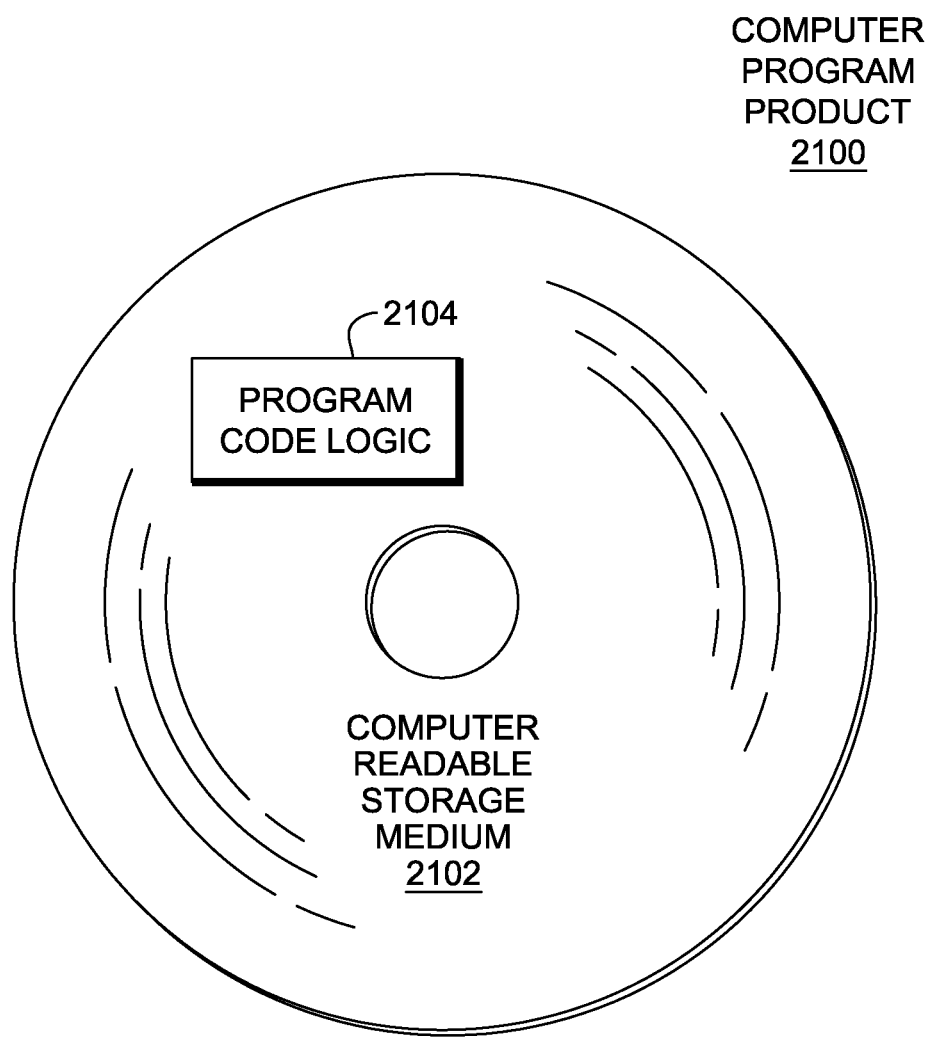
FIG. 21 depicts one embodiment of a computer program product.

Referring to FIG. 21, in one example, a computer program product 2100 includes, for instance, one or more non-transitory computer readable storage media 2102 to store computer readable program code means, logic and/or instructions 2104 thereon to provide and facilitate one or more embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different instructions, instruction formats, instruction fields and/or instruction values may be used. Yet further, other types of address translation may benefit from one or more aspects. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

In a further embodiment, one or more aspects relate to cloud computing. It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Figure 22:
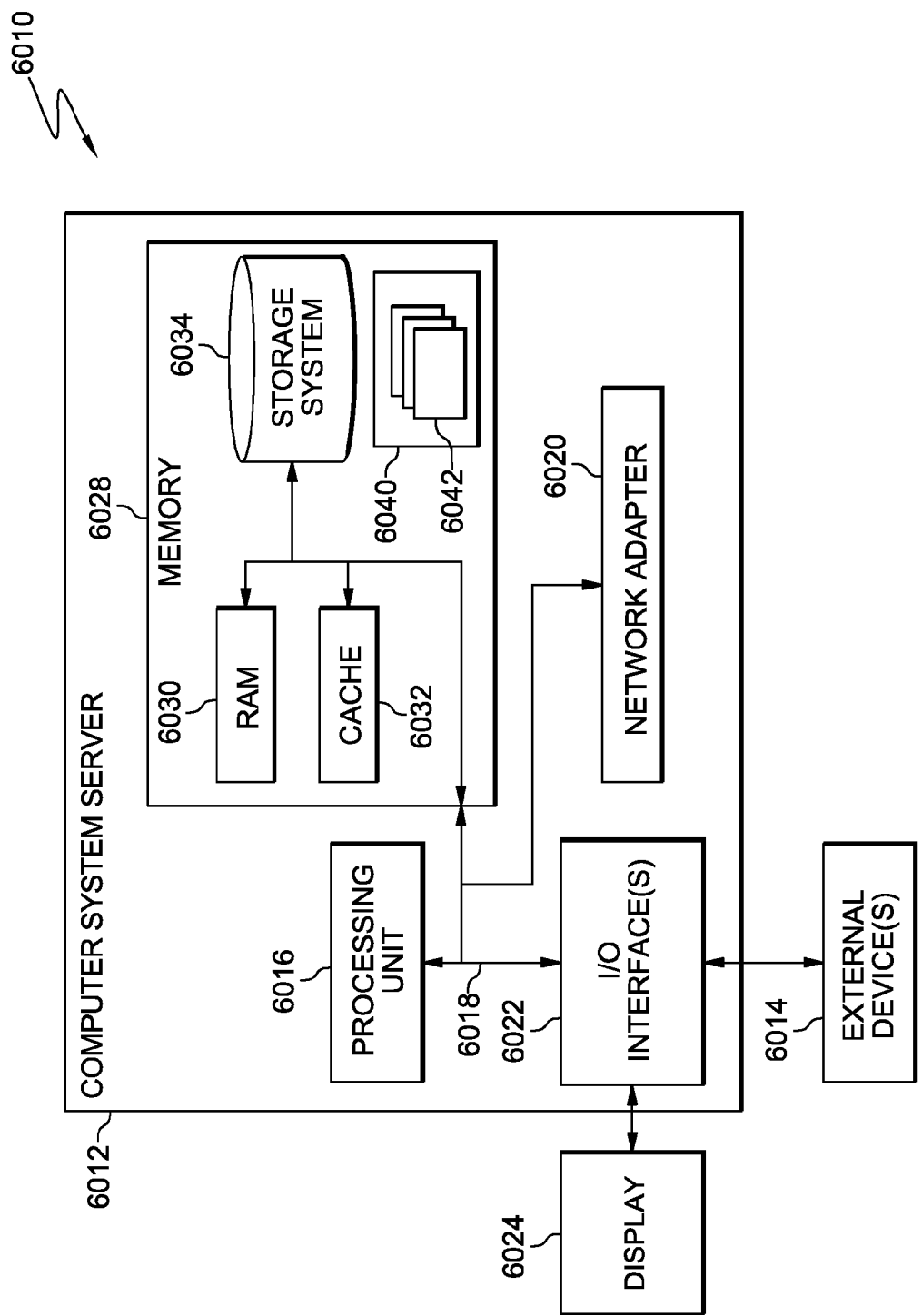
FIG. 22 depicts one embodiment of a cloud computing node.

Referring now to FIG. 22, a schematic of an example of a cloud computing node is shown. Cloud computing node 6010 is only one example of a suitable cloud computing node and is not intended to suggest any limitation as to the scope of use or functionality of embodiments of the invention described herein. Regardless, cloud computing node 6010 is capable of being implemented and/or performing any of the functionality set forth hereinabove.

In cloud computing node 6010 there is a computer system/server 6012, which is operational with numerous other general purpose or special purpose computing system environments or configurations. Examples of well-known computing systems, environments, and/or configurations that may be suitable for use with computer system/server 6012 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 6012 may be described in the general context of computer system executable instructions, such as program modules, being executed by a computer system. Generally, program modules may include routines, programs, objects, components, logic, data structures, and so on that perform particular tasks or implement particular abstract data types. Computer system/server 6012 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 22, computer system/server 6012 in cloud computing node 6010 is shown in the form of a general-purpose computing device. The components of computer system/server 6012 may include, but are not limited to, one or more processors or processing units 6016, a system memory 6028, and a bus 6018 that couples various system components including system memory 6028 to processor 6016.

Bus 6018 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 6012 typically includes a variety of computer system readable media. Such media may be any available media that is accessible by computer system/server 6012, and it includes both volatile and non-volatile media, removable and non-removable media.

System memory 6028 can include computer system readable media in the form of volatile memory, such as random access memory (RAM) 6030 and/or cache memory 6032. Computer system/server 6012 may further include other removable/non-removable, volatile/non-volatile computer system storage media. By way of example only, storage system 6034 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 6018 by one or more data media interfaces. As will be further depicted and described below, memory 6028 may include at least one program product having a set (e.g., at least one) of program modules that are configured to carry out the functions of embodiments of the invention.

Program/utility 6040, having a set (at least one) of program modules 6042, may be stored in memory 6028 by way of example, and not limitation, as well as an operating system, one or more application programs, other program modules, and program data. Each of the operating system, one or more application programs, other program modules, and program data or some combination thereof, may include an implementation of a networking environment. Program modules 6042 generally carry out the functions and/or methodologies of embodiments of the invention as described herein.

Computer system/server 6012 may also communicate with one or more external devices 6014 such as a keyboard, a pointing device, a display 6024, etc.; one or more devices that enable a user to interact with computer system/server 6012; and/or any devices (e.g., network card, modem, etc.) that enable computer system/server 6012 to communicate with one or more other computing devices. Such communication can occur via Input/Output (I/O) interfaces 6022. Still yet, computer system/server 6012 can communicate with one or more networks such as a local area network (LAN), a general wide area network (WAN), and/or a public network (e.g., the Internet) via network adapter 6020. As depicted, network adapter 6020 communicates with the other components of computer system/server 6012 via bus 6018. It should be understood that although not shown, other hardware and/or software components could be used in conjunction with computer system/server 6012. Examples, include, but are not limited to: microcode, device drivers, redundant processing units, external disk drive arrays, RAID systems, tape drives, and data archival storage systems, etc.

Figure 23:
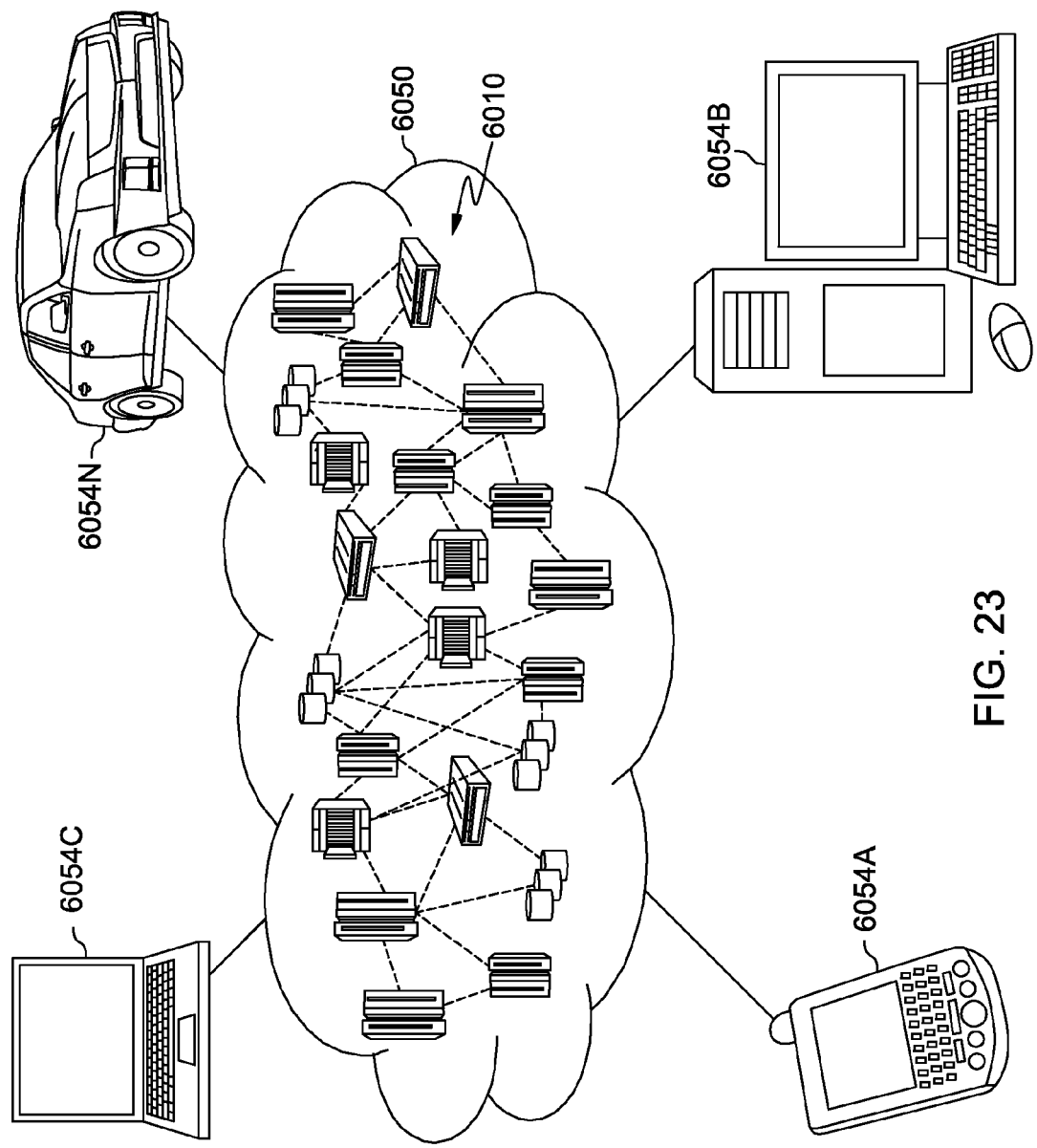
FIG. 23 depicts on embodiment of a cloud computing environment.

Referring now to FIG. 23, illustrative cloud computing environment 6050 is depicted. As shown, cloud computing environment 6050 comprises one or more cloud computing nodes 6010 with which local computing devices used by cloud consumers, such as, for example, personal digital assistant (PDA) or cellular telephone 6054A, desktop computer 6054B, laptop computer 6054C, and/or automobile computer system 6054N may communicate. Nodes 6010 may communicate with one another. They may be grouped (not shown) physically or virtually, in one or more networks, such as Private, Community, Public, or Hybrid clouds as described hereinabove, or a combination thereof. This allows cloud computing environment 6050 to offer infrastructure, platforms and/or software as services for which a cloud consumer does not need to maintain resources on a local computing device. It is understood that the types of computing devices 6054A-N shown in FIG. 23 are intended to be illustrative only and that computing nodes 6010 and cloud computing environment 6050 can communicate with any type of computerized device over any type of network and/or network addressable connection (e.g., using a web browser).

Figure 24:
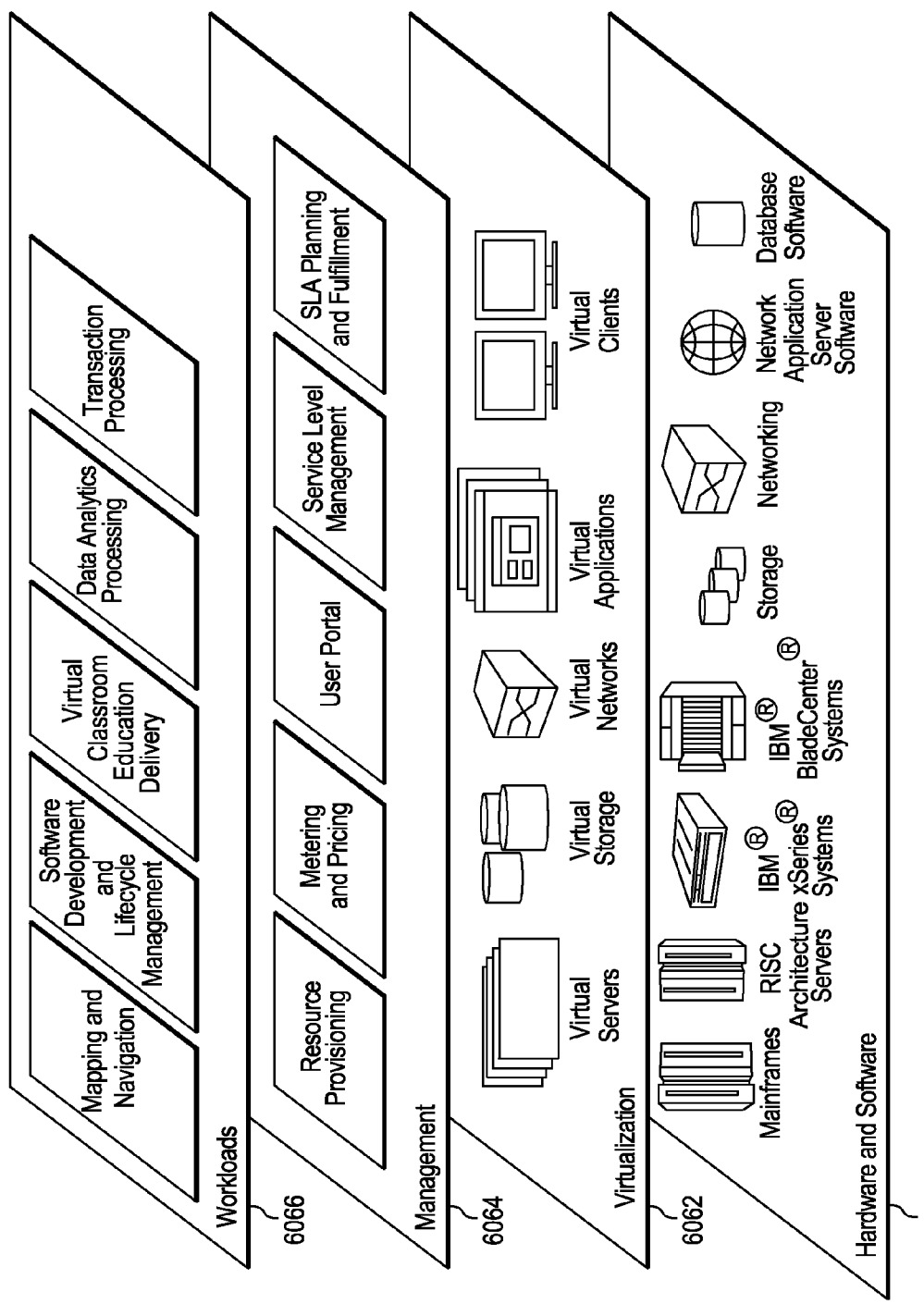
FIG. 24 depicts one example of abstraction model layers.

Referring now to FIG. 24, a set of functional abstraction layers provided by cloud computing environment 6050 (FIG. 23) is shown. It should be understood in advance that the components, layers, and functions shown in FIG. 24 are intended to be illustrative only and embodiments of the invention are not limited thereto. As depicted, the following layers and corresponding functions are provided:

Hardware and software layer 6060 includes hardware and software components. Examples of hardware components include mainframes, in one example IBM® ZSERIES® systems; RISC (Reduced Instruction Set Computer) architecture based servers, in one example IBM PSERIES® systems; IBM XSERIES® systems; IBM BLADECENTER® systems; storage devices; networks and networking components. Examples of software components include network application server software, in one example IBM WEBSPHERE® application server software; and database software, in one example IBM DB2® database software. (IBM, ZSERIES, PSERIES, XSERIES, BLADECENTER, WEBSPHERE, and DB2 are trademarks of International Business Machines Corporation registered in many jurisdictions worldwide).

Virtualization layer 6062 provides an abstraction layer from which the following examples of virtual entities may be provided: virtual servers; virtual storage; virtual networks, including virtual private networks; virtual applications and operating systems; and virtual clients.

In one example, management layer 6064 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 6066 provides examples of functionality for which the cloud computing environment may be utilized. Examples of workloads and functions which may be provided from this layer include: mapping and navigation; software development and lifecycle management; virtual classroom education delivery; data analytics processing; and transaction processing.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A method of facilitating processing within a computing environment, said method comprising:
    storing, by a processor of the computing environment, metadata relating to an instruction of the computing environment to be relocated from one memory location to another memory location, the instruction using program counter (PC)-relative addressing to access data and the instruction included in code that is dynamically optimized resulting in relocating the instruction to provide a relocated instruction;
    based on relocating the instruction, determining an address to be used to access the data by the relocated instruction, the determining being based on at least one of the metadata or an address of the another memory location, wherein the determining the address to be used to access the data comprises:
        accessing a register that is included in the code prior to optimizing the code to obtain a register address from the register, the register being a fixed number of instructions before or after the instruction, and the register address comprising an address of the one memory location;
        determining an offset to be used by the relocated instruction to access the data; and
        using the register address and the offset to determine the address to be used to access the data; and
    executing the relocated instruction at the another memory location, the executing using the determined address to access the data.

2. The method of claim 1, wherein the determining comprises adjusting the offset based on at least one of the metadata or the address of the another memory location, and using the adjusted offset to determine the address to be used to access the data.

3. A computer program product for facilitating processing within a computing environment, said computer program product comprising:
    a computer readable storage medium readable by a processing circuit and storing instructions for execution by the processing circuit for performing a method comprising:
        storing, by a processor of the computing environment, metadata relating to an instruction of the computing environment to be relocated from one memory location to another memory location, the instruction using program counter (PC)-relative addressing to access data and the instruction included in code that is dynamically optimized resulting in relocating the instruction to provide a relocated instruction;
        based on relocating the instruction, determining an address to be used to access the data by the relocated instruction, the determining being based on at least one of the metadata or an address of the another memory location, wherein the determining the address to be used to access the data comprises:
            accessing a register that is included in the code prior to optimizing the code to obtain a register address from the register, the register being a fixed number of instructions before or after the instruction, and the register address comprising an address of the one memory location;
            determining an offset to be used by the relocated instruction to access the data; and
            using the register address and the offset to determine the address to be used to access the data; and
        executing the relocated instruction at the another memory location, the executing using the determined address to access the data.

4. The computer program product of claim 3, wherein the metadata comprises an address of the one memory location.

5. The computer program product of claim 3, wherein the register is a special purpose register, including one of a come-from-address register or a target address register.

6. The computer program product of claim 3, wherein the determining comprises adjusting the offset based on at least one of the metadata or the address of the another memory location, and using the adjusted offset to determine the address to be used to access the data.

7. The computer program product of claim 6, wherein the adjusting comprises determining an absolute address and using the absolute address in adjusting the offset.

8. The computer program product of claim 3, wherein the instruction is included in code of a module, the module including the code and data, the data to be accessed by one or more instructions of the code, and wherein the relocating is a result of optimizing at least a portion of the code to provide optimized code, wherein the optimized code is placed in one or more memory locations different from one or more memory locations storing the code that is not optimized, and wherein the data is not relocated.

9. The computer program product of claim 3, wherein the instruction is included in a module having code and data, the code including the instruction, and wherein the relocating comprises storing the relocated instruction in the another memory location, the another memory location overlaying a data space of the module.

10. The computer program product of claim 3, wherein the instruction is included in a module having code and data, the code including the instruction, and wherein the relocating comprises storing the relocated instruction in the another memory location, the another memory location being one of before or after the module.

11. The computer program product of claim 3, wherein the instruction is of library code to be shared by a plurality of applications, and wherein the method further comprises based on optimizing the library code to provide optimized library code, storing the optimized library code at different memory locations for different applications of the plurality of applications.

12. The computer program product of claim 3, wherein the instruction is of library code to be shared by a plurality of applications, and wherein the method further comprises based on optimizing the library code to provide optimized library code, storing the optimized library code at a same memory location for different applications of the plurality of applications.

13. A computer system for facilitating processing within a computing environment, said computer system comprising:
   a memory; and
   a processor in communications with the memory, wherein the computer system is configured to perform a method, said method comprising:
      storing metadata relating to an instruction of the computing environment to be relocated from one memory location to another memory location, the instruction using program counter (PC)-relative addressing to access data and the instruction included in code that is dynamically optimized resulting in relocating the instruction to provide a relocated instruction;
      based on relocating the instruction, determining an address to be used to access the data by the relocated instruction, the determining being based on at least one of the metadata or an address of the another memory location, wherein the determining the address to be used to access the data comprises:
         accessing a register that is included in the code prior to optimizing the code to obtain a register address from the register, the register being a fixed number of instructions before or after the instruction, and the register address comprising an address of the one memory location;
         determining an offset to be used by the relocated instruction to access the data; and
         using the register address and the offset to determine the address to be used to access the data; and
      executing the relocated instruction at the another memory location, the executing using the determined address to access the data.

14. The computer system of claim 13, wherein the determining comprises adjusting the offset based on at least one of the metadata or the address of the another memory location, and using the adjusted offset to determine the address to be used to access the data.

15. The computer system of claim 13, wherein the instruction is included in code of a module, the module including the code and data, the data to be accessed by one or more instructions of the code, and wherein the relocating is a result of optimizing at least a portion of the code to provide optimized code, wherein the optimized code is placed in one or more memory locations different from one or more memory locations storing the code that is not optimized, and wherein the data is not relocated.

16. The computer system of claim 13, wherein the instruction is included in a module having code and data, the code including the instruction, and wherein the relocating comprises storing the relocated instruction in the another memory location, the another memory location overlaying a data space of the module.

17. The computer system of claim 13, wherein the instruction is included in a module having code and data, the code including the instruction, and wherein the relocating comprises storing the relocated instruction in the another memory location, the another memory location being one of before or after the module.

* * * * *